(12) United States Patent (10) Patent No.: US 10,079,547 B2
Kikuchi et al. (45) Date of Patent: Sep. 18, 2018

(54) INSULATING SYNCHRONOUS RECTIFYING DC/DC CONVERTER, SYNCHRONOUS RECTIFYING CONTROLLER, POWER SUPPLY USING THE SAME, POWER ADAPTER AND ELECTRONIC DEVICE, AND CONTROL METHOD OF SYNCHRONOUS RECTIFYING CONTROLLER

(71) Applicant: ROHM CO., LTD., Ukyo-Ku, Kyoto (JP)

(72) Inventors: Hiroki Kikuchi, Kyoto (JP); Ryo Shimizu, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 97 days.

(21) Appl. No.: 15/223,565

(22) Filed: Jul. 29, 2016

(65) Prior Publication Data

US 2017/0040904 A1 Feb. 9, 2017

(30) Foreign Application Priority Data

Aug. 7, 2015 (JP) .................................. 2015-157186

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0054* (2013.01); *Y02B 70/1475* (2013.01); *Y02B 70/1491* (2013.01)

(58) Field of Classification Search
CPC ................................................. H02M 3/33592
See application file for complete search history.

(56) References Cited

U.S. PATENT DOCUMENTS

| 9,001,532 | B2* | 4/2015 | Olivik | ............... | H02M 3/33592 |
|---|---|---|---|---|---|
| | | | | | 363/21.14 |
| 2009/0213628 | A1* | 8/2009 | Yang | ................. | H02M 3/33592 |
| | | | | | 363/89 |
| 2015/0318790 | A1* | 11/2015 | Tichy | ................ | H02M 3/33592 |
| | | | | | 363/21.14 |

(Continued)

FOREIGN PATENT DOCUMENTS

JP 2010074959 A 4/2010

*Primary Examiner* — Timothy J Dole
*Assistant Examiner* — Ishrat Jamali
(74) *Attorney, Agent, or Firm* — Cantor Colburn LLP

(57) ABSTRACT

A synchronous rectifying controller on secondary side of insulating synchronous rectifying converter to control synchronous rectifying transistor, comprising: first comparator to compare drain voltage of the transistor with first negative threshold voltage, and assert set signal based on the comparison of them; second comparator to compare drain voltage with second negative threshold voltage, and assert reset signal based on the comparison of them; third comparator to compare drain voltage with third positive threshold voltage, and assert release signal based on the comparison of them; control circuit set in response to the assertion of the set signal and to adjust control pulse to have ON level, and reset in response to the assertion of the reset signal and to adjust the control pulse to have OFF level; and driver to drive the transistor, wherein set operation of the control circuit is inhibited until the release signal is asserted.

10 Claims, 18 Drawing Sheets

(56) References Cited

U.S. PATENT DOCUMENTS

| | | | | |
|---|---|---|---|---|
| 2016/0036339 A1* | 2/2016 | Kikuchi | ............ | H02M 3/33592 |
| | | | | 363/21.14 |
| 2016/0036340 A1* | 2/2016 | Kikuchi | .................. | H02M 1/32 |
| | | | | 363/21.14 |
| 2016/0190942 A1* | 6/2016 | Kikuchi | ............ | H02M 3/33507 |
| | | | | 363/21.14 |

* cited by examiner

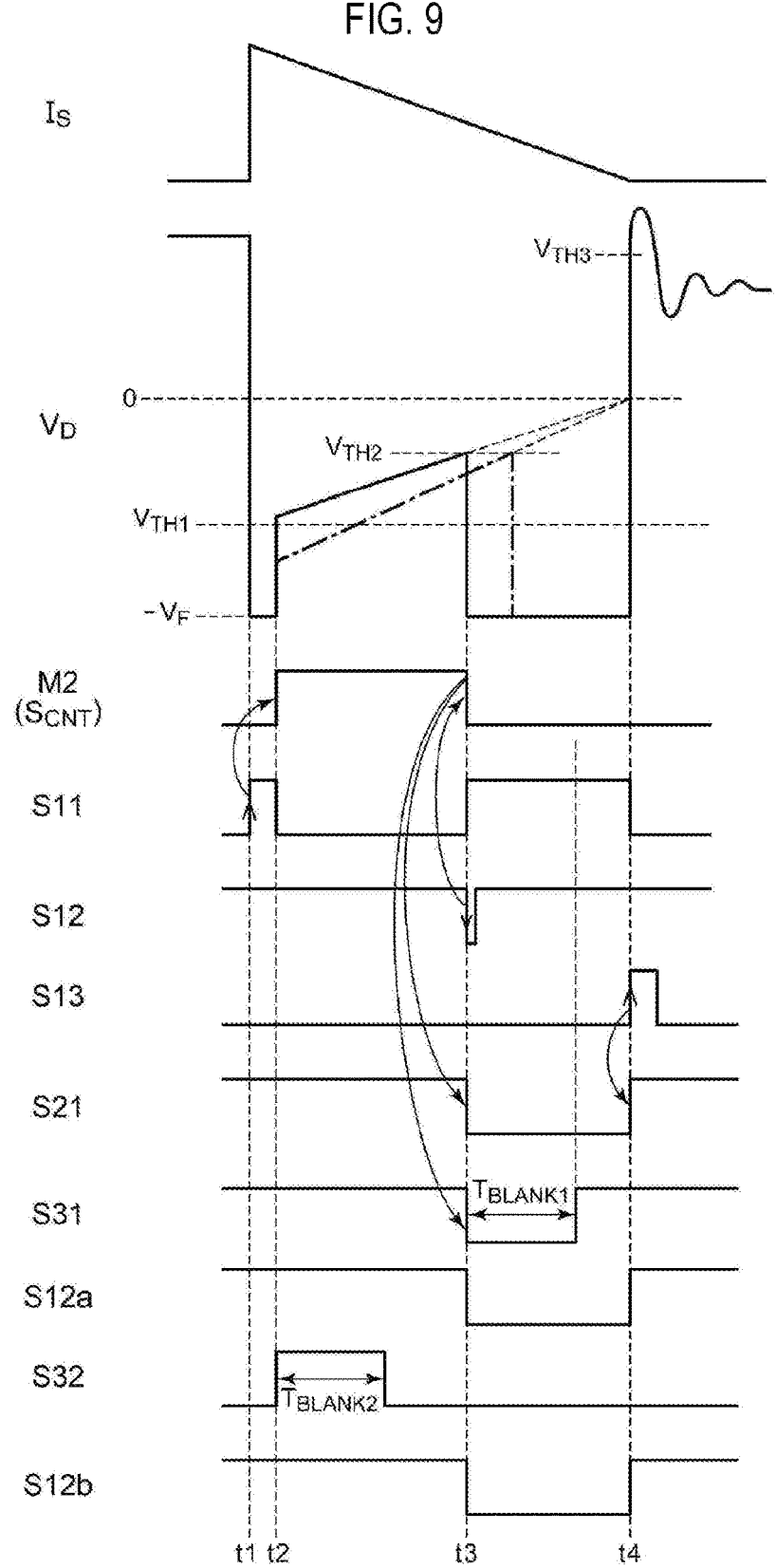

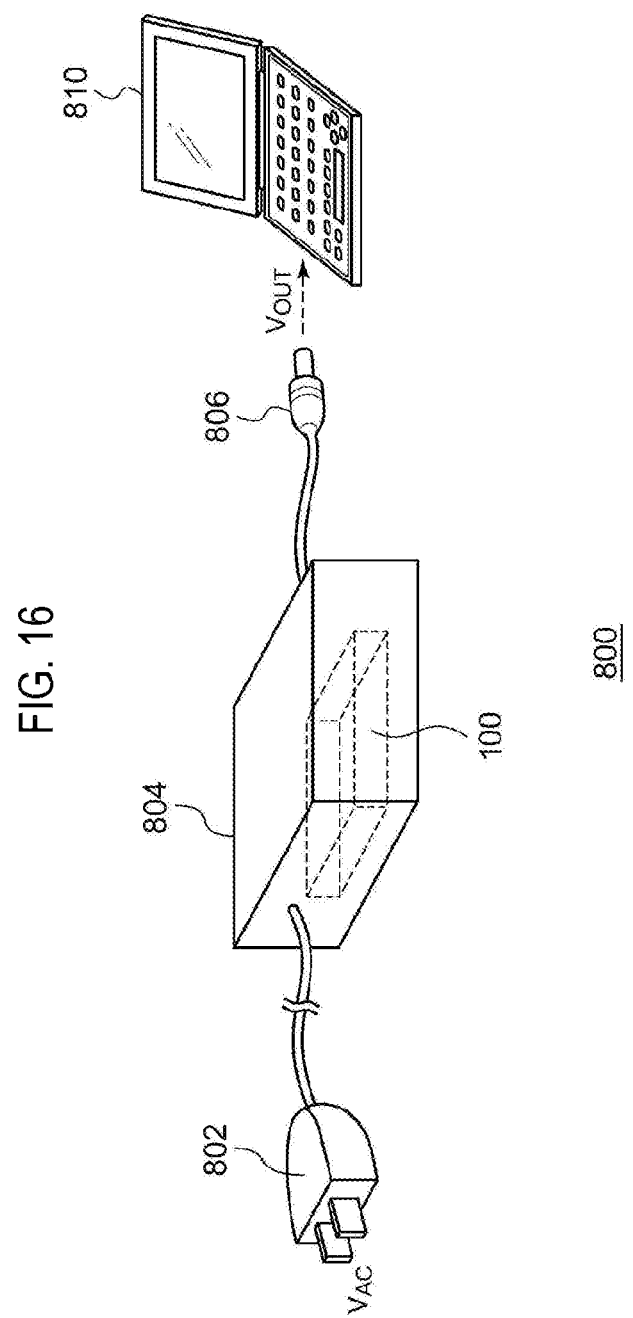

INSULATING SYNCHRONOUS RECTIFYING DC/DC CONVERTER, SYNCHRONOUS RECTIFYING CONTROLLER, POWER SUPPLY USING THE SAME, POWER ADAPTER AND ELECTRONIC DEVICE, AND CONTROL METHOD OF SYNCHRONOUS RECTIFYING CONTROLLER

CROSS-REFERENCE TO RELATED APPLICATION(S)

This application is based upon and claims the benefit of priority from Japanese Patent Application No. 2015-157186, filed on Aug. 7, 2015, the entire contents of which are incorporated herein by reference.

TECHNICAL FIELD

The present disclosure relates to an insulating synchronous rectifying DC/DC converter.

BACKGROUND

Various household appliances including televisions or refrigerators operate with commercial AC power received from outside. Electronic devices including notebook computers, mobile terminals, and tablet terminals are also operable with a commercial AC power, or batteries built into the devices may be charged with commercial AC power. Such household appliances or electronic devices (hereinafter, generally referred to as "electronic devices") are equipped with a power supply (AC/DC converter) for AC/DC converting commercial AC voltage. Alternatively, an AC/DC converter may be incorporated in an external power adapter (AC adapter) of an electronic device.

FIG. 1 is a block diagram illustrating a basic configuration of an AC/DC converter 100r. The AC/DC converter 100r mainly includes a filter 102, a rectifying circuit 104, a smoothing capacitor 106, and a DC/DC converter 200r.

A commercial AC voltage $V_{AC}$ is input to the filter 102 through a fuse and an input capacitor (not shown). The filter 102 removes noises from the commercial AC voltage $V_{AC}$. The rectifying circuit 104 is a diode bridge circuit for full-wave rectifying the commercial AC voltage $V_{AC}$. An output voltage from the rectifying circuit 102 is smoothed by the smoothing capacitor 106 and converted into a DC voltage $V_{IN}$.

The insulating DC/DC converter 200r receives the DC voltage $V_{IN}$ at an input terminal P1, steps down the received DC voltage $V_{IN}$, and supplies an output voltage $V_{OUT}$ stabilized to a target value to a load (not shown) connected to an output terminal P2.

The DC/DC converter 200r includes a primary side controller 202, a photocoupler 204, a feedback circuit 206, an output circuit 210, a synchronous rectifying controller 300r, and other circuit components. The output circuit 210 includes a transformer T1, a diode D1, an output capacitor C1, a switching transistor M1, and a synchronous rectifying transistor M2. The topology of the output circuit 210 is the same as that of a general synchronous rectifying flyback converter, and thus, a description thereof will be omitted.

As the switching transistor M1 connected to a primary winding W1 of the transformer t1 is switched, the input voltage $V_{IN}$ is stepped down to generate the output voltage $V_{OUT}$. Further, the primary side controller 202 adjusts a switching duty ratio of the switching transistor M1.

The output voltage $V_{OUT}$ of the DC/DC converter 200r is divided by resistors R1 and R2. The feedback circuit 206, which includes, for example, a shunt regulator or an error amplifier, amplifies an error between the divided voltage (voltage detection signal) $V_S$ and a predetermined reference voltage $V_{REF}$ (not shown), generates an error current $I_{ERR}$ corresponding to the error, and draws (sinks) the error current $I_{ERR}$ from a light emitting element (light emitting diode (LED)) at an input side of the photocoupler 204.

A feedback current $I_{FB}$ corresponding to the error current $I_{ERR}$ of a secondary side flows to a light receiving element (phototransistor) at an output side of the photocoupler 204. The feedback current $I_{FB}$ is smoothed by a resistor and a capacitor and input to a feedback (FB) terminal of the primary side controller 202. The primary side controller 202 adjusts a duty ratio of the switching transistor M1 based on a voltage (feedback voltage) $V_{FB}$ of the FB terminal.

The synchronous rectifying controller 300r switches the synchronous rectifying transistor M2 in synchronization with the switching of the switching transistor M1. More specifically, when the switching transistor M1 is turned off, the synchronous rectifying controller 300r turns on the synchronous rectifying transistor M2, and when a secondary current $I_S$ flowing through the secondary winding W2 during an ON period of the synchronous rectifying transistor M2 becomes substantially zero, the synchronous rectifying controller 300r turns off the synchronous rectifying transistor M2.

The overall configuration of the AC/DC converter 100r has been described above.

Next, the synchronous rectifying controller 300r will be described. FIG. 2 is a circuit diagram of the synchronous rectifying controller 300r reviewed by the present inventors. Further, the synchronous rectifying controller 300r of FIG. 2 should not be recognized as a known art.

The synchronous rectifying controller 300r has a drain sense (DRAIN) terminal, a gate output (GATE) terminal, and a ground (GND) terminal. The DRAIN terminal is connected to a drain of the synchronous rectifying transistor M2, and the GND terminal is grounded and commonly connected to a source of the synchronous rectifying transistor M2.

The synchronous rectifying controller 300r includes a first comparator CMP1, a second comparator CMP2, a first blanking circuit 312, a second blanking circuit 314, a first flip-flop FF1, and a driver 306. The first comparator (also called a "set comparator") CMP1 compares a drain voltage (a voltage between the drain and the source) $V_D$ of the synchronous rectifying transistor M2 with a first negative threshold voltage $V_{TH1}$ (for example, −100 mV), and when $V_D < V_{TH1}$, the first comparator CMP1 asserts a set signal S11 (for example, a high level). The set signal S11 is input to a set terminal of the first flip-flop FF1, and as the set signal S11 is asserted, an output (also called a control pulse) $S_{CNT}$ of the first flip-flop FF1 has a high level. The first blanking circuit 312 masks the set signal S11 during a predetermined blanking time $T_{BLNK1}$ as the control pulse $S_{CNT}$ is changed.

The second comparator (also called a reset comparator) CMP2 compares the drain voltage (the voltage between the drain and the source) $V_D$ of the synchronous rectifying transistor M2 with a second negative threshold voltage $V_{TH2}$ (for example, −3 mV), and when $V_H > V_{TH2}$, the second comparator CMP2 asserts the reset signal S12 (for example, a low level). The reset signal S12 is input to a reset terminal (negative logic) of the first flip-flop FF1, and the control pulse $S_{CNT}$ has a low level as the reset signal S12 is asserted (negative edge). The second blanking circuit 314 masks the reset signal S12 during a predetermined blanking time $T_{BLNK2}$ as the control pulse $S_{CNT}$ is changed. The driver 306 switches the synchronous rectifying transistor M2 depending on the control pulse $S_{CNT}$.

FIG. 3 is an operational waveform view of the synchronous rectifying controller 300r in a discontinuous mode. At a time t0, the switching transistor M1 is turned on. During an ON period $T_{ON1}$ of the switching transistor M1, a voltage across the secondary winding W2 is $-V_{IN} \times N_S/N_P$, and thus, the drain voltage $V_D$ (i.e., a voltage $V_{DS}$ between the drain and the source) of the synchronous rectifying transistor M2 is $V_D = V_{OUT} + V_{IN} \times N_S/N_P$. $N_P$ and $N_S$ denote the number of windings of the primary winding W1 and the secondary winding W2, respectively.

When the switching transistor M1 is turned off at a time t1, since the secondary current $I_S$ flows from the source of the synchronous rectifying transistor M2 to the drain thereof, the voltage between the drain and the source of the synchronous rectifying transistor M2 becomes a negative voltage. When the drain voltage $V_D$ is lower than the first negative threshold voltage $V_{TH1}$ (for example, −100 mV) (time t1), the synchronous rectifying controller 300r immediately turns on the synchronous rectifying transistor M2 (time t2). During a delay of t1 to t2, the secondary current $I_S$ flows through a body diode of the synchronous rectifying transistor M2 and the drain voltage $V_D$ is $-V_F$. $V_F$ is a forward voltage of the diode.

During an ON period $T_{ON2}$ of the synchronous rectifying transistor M2, the secondary current $I_S$ is reduced and an absolute value of the voltage $V_{DS}$ between the drain and the source is reduced according to a reduction in energy stored in the transformer t1. As a result, when the secondary current $I_S$ becomes substantially zero, the voltage $V_{DS}$ between the drain and the source also becomes substantially zero. When an ON resistance of the synchronous rectifying transistor M2 is $R_{ON2}$, the drain voltage $V_D$ during the ON period $T_{ON2}$ is $-I_S \times R_{ON2}$.

When the drain voltage $V_D$ exceeds the second negative threshold voltage $V_{TH2}$ (for example, −3 mV) (time t3), the synchronous rectifying controller 300r immediately turns off the synchronous rectifying transistor M2. When the secondary current $I_S$ becomes zero at a time t4, the drain voltage $V_D$ is ringing. Thereafter, the switching transistor M1 is turned on again at a time t5.

When the drain voltage $V_D$ exceeds the first threshold voltage $V_{TH1}$ at the time t4, the set signal S11 is asserted. However, since the set signal S11 is masked by the first blanking circuit 312, the synchronous rectifying transistor M2 is prevented from being turned on.

The present inventors reviewed the DC/DC converter 200r of FIG. 1 and reached the recognition of the following problems. Regarding the ON resistance $R_{ON2}$ of the synchronous rectifying transistor M2, when the ON resistance $R_{ON2}$ is small in variations thereof, the synchronous rectifying transistor M2 is turned on twice, causing malfunction. This problem will be described in detail below.

FIG. 4 is an operational waveform view of the synchronous rectifying controller 300r when the ON resistance $R_{ON2}$ of the synchronous rectifying transistor M2 is small. The drain voltage $V_D$ when the ON resistance $R_{ON2}$ is small is indicated by the solid line (i), and the drain voltage $V_D$ when the ON resistance $R_{ON2}$ is large is indicated by the alternate long and short dash line (ii) for comparison. A slope of the drain voltage $V_D$ during the ON period of the synchronous rectifying transistor M2 is in proportion to the ON resistance $R_{ON2}$. When the threshold voltage $V_{TH2}$ is constant, the timing t3 at which the reset signal S12 is asserted is shifted ahead as the ON resistance $R_{ON2}$ is smaller and the blanking period $T_{BLANK1}$ of the first blanking circuit 312 is shifted ahead. As a result, a portion of the second assert section of the set signal S11 is generated later than the blanking period $T_{BLANK1}$, and accordingly, the synchronous rectifying transistor M2 is turned on again at the time t4, causing malfunction.

Thus, in the synchronous rectifying controller 300r of FIG. 2, the synchronous rectifying transistor M2 is turned on a plurality of times within one period in an application in which the ON resistance $R_{ON2}$ of the synchronous rectifying transistor M2 is small. This is undesirable because it means an increase in switching loss in a light load state, and further, a degradation of efficiency.

SUMMARY

The present disclosure provides some embodiments of a synchronous rectifying controller capable of preventing a synchronous rectifying transistor M2 from being turned on twice.

According to one embodiment of the present disclosure, there is provided a synchronous rectifying controller disposed on a secondary side of an insulating synchronous rectifying DC/DC converter to control a synchronous rectifying transistor. The synchronous rectifying controller includes: a first comparator configured to compare a drain voltage of the synchronous rectifying transistor with a first negative threshold voltage, and when the drain voltage is lower than the first threshold voltage, assert a set signal; a second comparator configured to compare the drain voltage with a second negative threshold voltage, and when the drain voltage is higher than the second threshold voltage, assert a reset signal; a third comparator configured to compare the drain voltage with a third positive threshold voltage, and when the drain voltage is higher than the third threshold voltage, assert a release signal; a control circuit set in response to the assertion of the set signal and configured to adjust a control pulse as an output thereof to have an ON level indicating ON of the synchronous rectifying transistor, and reset in response to the assertion of the reset signal and configured to adjust the control pulse to have an OFF level indicating OFF of the synchronous rectifying transistor; and a driver configured to drive the synchronous rectifying transistor depending on the control pulse. The set operation of the control circuit is inhibited until the release signal is asserted after the control pulse transitions to the OFF level.

According to this embodiment, it is possible to prevent the synchronous rectifying transistor from being turned on twice.

The control circuit may include: a first flip-flop having a set terminal to which the set signal is input and a reset terminal to which the reset signal is input, and configured to output the control pulse; and a forcible OFF circuit configured to receive the control pulse and the release signal and forcibly fix the reset signal to an asserted state until the release signal is asserted after the control pulse transitions to the OFF level.

Thus, the set operation of the synchronous rectifying transistor is negated, so that the synchronous rectifying transistor is inhibited from being turned on.

The forcible OFF circuit may include: a mask signal generating circuit configured to generate a mask signal having a first level in response to a negative edge of the control pulse and a second level in response the assertion of the release signal; and a logic gate configured to receive the mask signal and the reset signal and output them to the reset terminal of the first flip-flop.

Further, the logic gate may be designed such that an output thereof has an appropriate logic level.

The mask signal generating circuit may include: a second flip-flop set according to a negative edge of the control pulse and reset according to the release signal; and an inverter configured to invert an output from the second flip-flop. The logic gate may include an AND gate.

The control circuit may further include a first blanking circuit configured to forcibly fix the reset signal to an asserted state during a predetermined first blanking time after the control pulse transitions to the OFF level.

The control circuit may further include a first blanking circuit configured to forcibly fix the set signal to a negated state during a predetermined first blanking time after the control pulse transitions to the OFF level.

The control circuit may further include a second blanking circuit configured to forcibly fix the reset signal to a negated state during a predetermined second blanking time after the control pulse transitions to the ON level.

According to another embodiment of the present disclosure, there is provided a synchronous rectifying controller. The synchronous rectifying controller includes: a pulse generator configured to generate a control pulse based on a voltage across the synchronous rectifying transistor, and to adjust the control pulse to have an ON level indicating ON of the synchronous rectifying transistor when it is detected that a switching transistor at a primary side of the DC/DC converter is turned off and adjust the control pulse to have an OFF level indicating OFF of the synchronous rectifying transistor when it is detected that a current of a secondary winding of a transformer becomes substantially zero; a driver configured to switch the synchronous rectifying transistor depending on the control pulse; and a forcible OFF circuit configured to start to measure time when it is detected that the switching transistor is turned on, and after a predetermined time-up period lapses or when the synchronous rectifying transistor is turned off, configured to shift to a forcible OFF state where the synchronous rectifying transistor is forcibly turned off.

According to this embodiment, it is possible to prevent the synchronous rectifying transistor from being turned on twice.

In some embodiments, the synchronous rectifying controller may further include a fourth comparator configured to compare a drain voltage of the synchronous rectifying transistor with a fourth positive threshold voltage. The forcible OFF circuit may be configured to start to measure time when the drain voltage exceeds the fourth threshold voltage.

The pulse generator may include: a set signal generating part configured to generate a set signal asserted when it is detected that the switching transistor is turned off; a reset signal generating part configured to generate a reset signal asserted when it is detected that the current of a secondary winding of the transformer becomes substantially zero; and a first flip-flop configured to generate the control pulse which transitions to an ON level when the set signal is asserted and transitions to an OFF level when the reset signal is asserted.

The forcible OFF circuit may be configured to generate a forcible OFF signal asserted after the time-up period lapses since it is detected that the switching transistor is turned on or when the synchronous rectifying transistor is turned off, and the first flip-flop may be configured to transition the control pulse to an OFF level when at least one of the reset signal and the forcible OFF signal is asserted.

The set signal generating part may include a first comparator configured to compare a drain voltage of the synchronous rectifying transistor with a first negative threshold voltage to output the set signal based on a comparison result. The reset signal generating part may include a second comparator configured to compare the drain voltage with a second negative threshold voltage to output the reset signal based on a comparison result.

The forcible OFF circuit may include: a capacitor; a current source configured to charge the capacitor; a fifth comparator configured to compare a voltage of the capacitor with a predetermined fifth threshold voltage; and a pull-up circuit configured to pull up the voltage of the capacitor to a voltage higher than the fifth threshold voltage when the synchronous rectifying transistor is turned off, wherein the forcible OFF circuit may shift to the forcible OFF state depending on an output from the fifth comparator.

According to still another embodiment of the present disclosure, there is provided a synchronous rectifying controller. The synchronous rectifying controller includes: a first comparator configured to compare a drain voltage of the synchronous rectifying transistor with a first negative threshold voltage, and when the drain voltage is lower than the first threshold voltage, assert a set signal; a second comparator configured to compare the drain voltage with a second negative threshold voltage, and when the drain voltage is higher than the second threshold voltage, assert a reset signal; a first flip-flop configured to generate a control pulse which transitions to an ON level when the set signal is asserted and transitions to an OFF level when at least one of the reset signal and a forcible OFF signal is asserted; a fourth comparator configured to compare the drain voltage with a fourth positive threshold voltage, and when the drain voltage is higher than the fourth threshold voltage, assert a detection signal; and a forcible OFF circuit configured to start to measure time when the detection signal is asserted, and to assert the forcible OFF signal after a predetermined time-up time lapses or when the control pulse transitions to the OFF level.

The forcible OFF circuit may include: a capacitor; a current source configured to charge the capacitor; a fifth comparator configured to compare a voltage of the capacitor with a predetermined fifth threshold voltage; and a pull-up circuit configured to pull up the voltage of the capacitor to a voltage higher than the fifth threshold voltage when the synchronous rectifying transistor is turned off, wherein the forcible OFF signal may depend on an output from the fifth comparator.

In some embodiments, the synchronous rectifying controller may be integrated on a single semiconductor substrate. The term "integrated" may include a case in which all the components of a circuit are formed on a semiconductor substrate or a case in which major components of a circuit are integrated, and some resistors, capacitors, or the like may be installed outside the semiconductor substrate in order to adjust circuit constants. By integrating the circuit on one chip, it is possible to reduce a circuit area and allow circuit elements to have uniform characteristics.

According to still another embodiment of the present disclosure, there is provided an insulating synchronous rectifying DC/DC converter. The DC/DC converter includes: a transformer having a primary winding and a secondary winding; a switching transistor connected to the primary winding of the transformer; a synchronous rectifying transistor connected to the secondary winding of the transformer; a photocoupler; a primary side controller connected to an output side of the photocoupler to switch the switching transistor depending on a feedback signal of the photocoupler; any one of the synchronous rectifying controllers described above, configured to control the synchronous rectifying transistor; and a feedback circuit connected to an input side of the photocoupler to generate an error current corresponding to an output voltage of the DC/DC converter.

The DC/DC converter may be a flyback type converter or a forward type converter.

According to still further embodiments of the present disclosure, there is provided a power supply (AC/DC converter). The power supply includes: a filter configured to filter a commercial AC voltage; a diode rectifier circuit configured to full-wave rectify an output voltage from the filter; a smoothing capacitor configured to smooth the output voltage from the diode rectifier circuit to generate a DC input voltage; and any one of the DC/DC converters described above, configured to step down the DC input voltage and supply the same to a load.

According to another embodiment of the present disclosure, there is provided an electronic device. The electronic device includes: a load; a filter configured to filter a commercial AC voltage; a diode rectifier circuit configured to full-wave rectify an output voltage from the filter; a smoothing capacitor configured to smooth the output voltage from the diode rectifier circuit to generate a DC input voltage; and any one of the DC/DC converters described above, configured to step down the DC input voltage and supply the same to the load.

According to still another embodiment of the present disclosure, there is provided an AC adaptor. The AC adaptor includes: a filter configured to filter a commercial AC voltage; a diode rectifier circuit configured to full-wave rectify an output voltage from the filter; a smoothing capacitor configured to smooth the output voltage from the diode rectifier circuit to generate a DC input voltage; and any one of the DC/DC converters described above, configured to step down the DC input voltage and supply the same to a load.

Also, arbitrarily combining the foregoing components or converting the expression of the present disclosure among a method, an apparatus, and the like is also effective as an embodiment of the present disclosure.

BRIEF DESCRIPTION OF THE DRAWINGS

FIG. 9 is an operational waveform view of the synchronous rectifying controller of FIGS. 7 and 8.

FIG. 16 is a view illustrating an AC adapter having an AC/DC converter.

DETAILED DESCRIPTION

Figure 1:
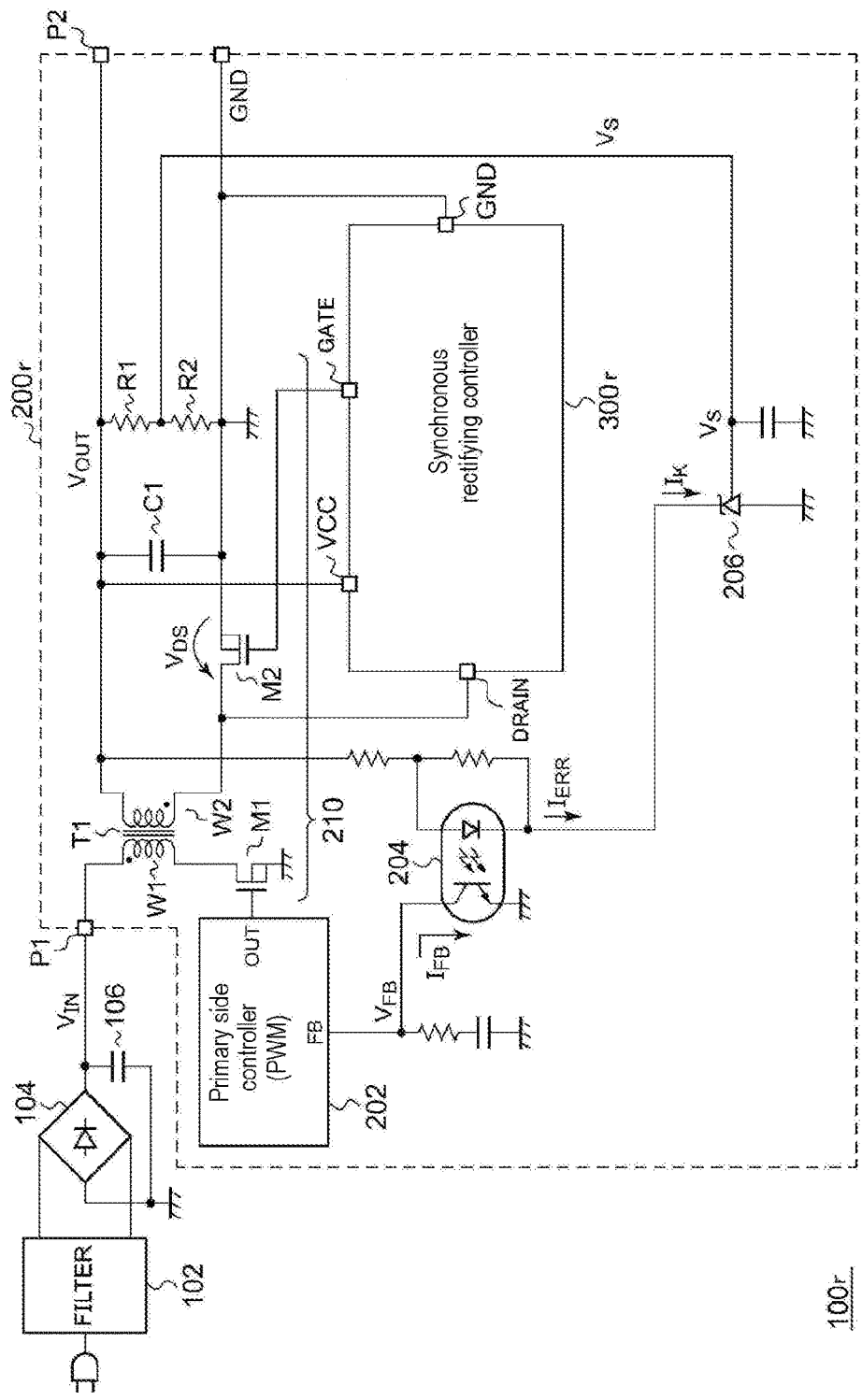
FIG. 1 is a block diagram illustrating a basic configuration of an AC/DC converter.

Embodiments of the present disclosure will be now described in detail with reference to the drawings. Like or equivalent components, members, and processes illustrated in each drawing are given like reference numerals and a repeated description thereof will be properly omitted. Also, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case in which the member A and the member B are indirectly connected through any other member that does not affect an electrical connection state therebetween.

Similarly, "a state where a member C is installed between a member A and a member B" also includes a case where the member A and the member C or the member B and the member C are indirectly connected through any other member that does not affect an electrical connection state therebetween, in addition to a case in which the member A and the member C or the member B and the member C are directly connected.

First Embodiment

Figure 5:
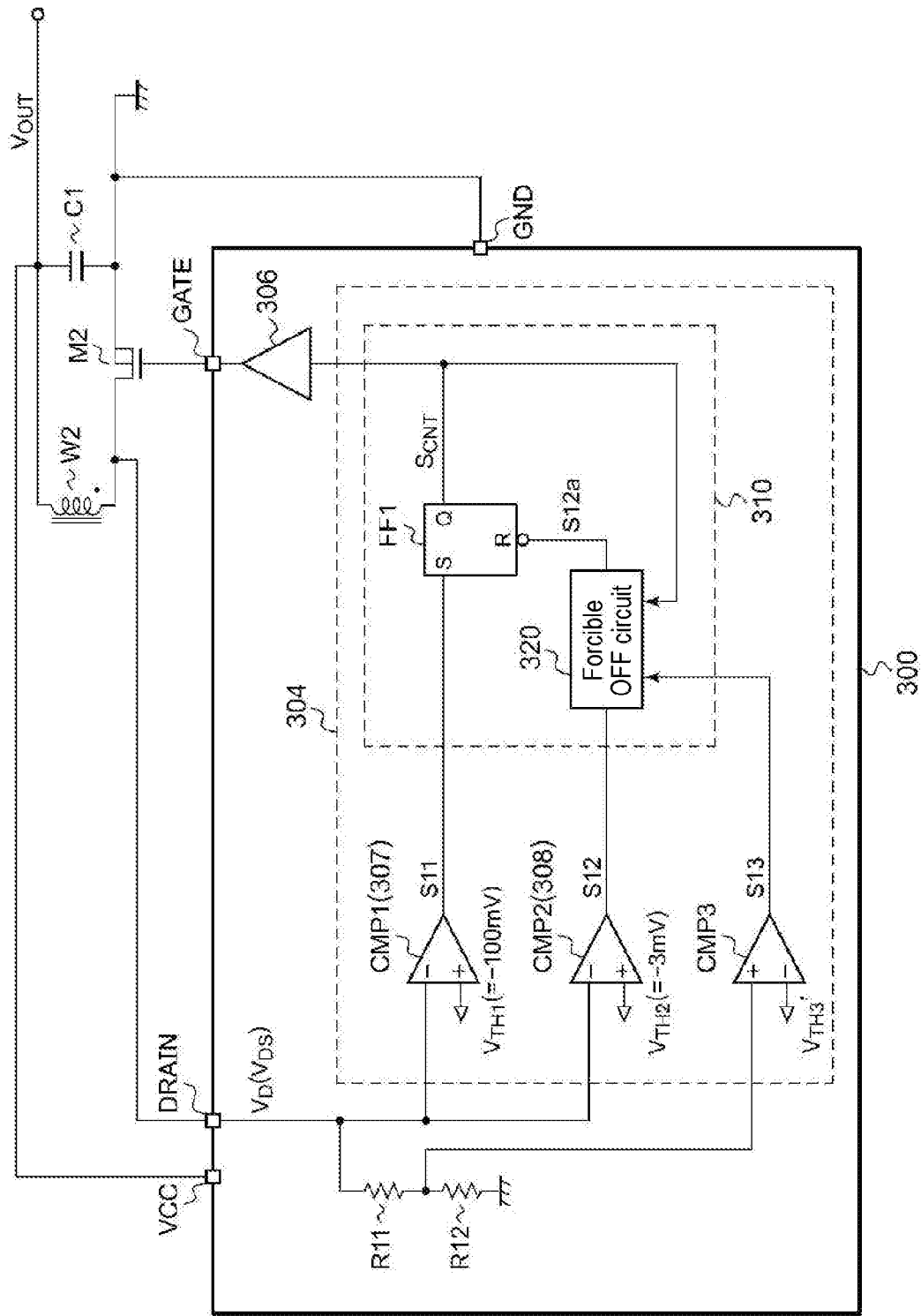
FIG. 5 is a circuit diagram of a synchronous rectifying controller according to a first embodiment.

FIG. 5 is a circuit diagram of a synchronous rectifying controller 300 according to a first embodiment. The peripheral circuits of the synchronous rectifying controller 300 are the same as those illustrated in FIG. 1, and therefore, only part thereof is illustrated and a description thereof will be omitted.

The synchronous rectifying controller 300 has a power (VCC) terminal, a gate output (GATE) terminal, a drain sense (DRAIN) terminal, and a ground (GND) terminal, and is a functional integrated circuit (IC) integrated on a single semiconductor substrate. The synchronous rectifying controller 300 may be accommodated in the same package together with the synchronous rectifying transistor M2 to constitute an integral single module.

An output voltage $V_{OUT}$ from the DC/DC converter 200 is supplied to the VCC terminal of the synchronous rectifying controller 300, the GND terminal is connected to the source of the synchronous rectifying transistor M2 and also grounded, the DRAIN terminal is connected to the drain of the synchronous rectifying transistor M2, and the GATE terminal is connected to the gate of the synchronous rectifying transistor M2.

The synchronous rectifying controller 300 having the GND terminal connected to the source of the synchronous rectifying transistor M2 operates based on a source voltage, and thus, the drain voltage $V_D$ of the DRAIN terminal is equal to the voltage $V_{DS}$ across the synchronous rectifying transistor M2 (i.e., a voltage between the drain and the source).

The synchronous rectifying controller 300 has a pulse generator 304 and a driver 306. The pulse generator 304 generates a control pulse $S_{CNT}$ based on the voltage $V_{DS}$ (hereinafter, also referred to simply as the drain voltage $V_D$) across the synchronous rectifying transistor M2. When it is detected that the switching transistor M1 at the primary side of the DC/DC converter 200 is turned off, the pulse generator 304 adjusts the control pulse $S_{CNT}$ to have an ON level (for example, a high level) indicating ON of the synchronous rectifying transistor M2, and when it is detected that the current $I_S$ of the secondary winding W2 of the transformer T1 becomes substantially zero, the pulse generator 304 adjusts the control pulse $S_{CNT}$ to have an OFF level (for example, a low level) indicating OFF of the synchronous rectifying transistor M2. The driver 306 switches the synchronous rectifying transistor M2 depending on the control pulse $S_{CNT}$.

The pulse generator 304 has a first comparator CMP1, a second comparator CMP2, a third comparator CMP3, and a control circuit 310. The first comparator CMP1 compares the drain voltage $V_D$ with a first negative threshold voltage $V_{TH1}$, and when the drain voltage $V_D$ is lower than the first threshold voltage $V_{TH1}$, the first comparator CMP1 asserts a set signal S11. The first threshold voltage $V_{TH1}$ is about −100 mV. The first comparator CMP1 may be recognized as a set signal generating part 307 for detecting turn-off of the switching transistor M1. The second comparator CMP2 compares the drain voltage $V_D$ with a second negative threshold voltage $V_{TH2}$, and when the drain voltage $V_D$ is higher than the second threshold voltage $V_{TH2}$, the second comparator CMP2 asserts a reset signal S12. The second threshold voltage $V_{TH2}$ is about −3 mV. The second comparator CMP2 may be recognized as a reset signal generating part 308 for detecting turn-off of the switching transistor M1.

Resistors R11 and R12 divide the drain voltage $V_D$. The third comparator CMP3 compares a divided drain voltage $V_D'$ with a third threshold voltage $V_{TH3}'$. The third comparator CMP3 equivalently compares the drain voltage $V_D$ with a third positive threshold voltage $V_{TH3}$, and when the drain voltage $V_D$ is higher than the third threshold voltage $V_{TH3}$ the third comparator CMP3 asserts a release signal S13. The third threshold voltage $V_{TH3}$ is determined to be, for example, about $V_{CC} \times 1.4$ higher than the source voltage $V_{CC}$.

The control circuit 310 is set in response to the assertion of the set signal S11, and the control pulse $S_{CNT}$ as an output thereof transitions to an ON level (for example, a high level) indicating ON of the synchronous rectifying transistor M2. Also, the control circuit 310 is reset in response to the assertion of the reset signal S12, and the control pulse $S_{CNT}$ transitions to an OFF level (for example, a low level) indicating OFF of the synchronous rectifying transistor M2.

The set operation of the control circuit 310 is inhibited until the release signal S13 is asserted after the control pulse $S_{CNT}$ transitions to the OFF level, so that the control pulse $S_{CNT}$ is inhibited from transitioning to an ON level.

The control circuit 310 includes a first flip-flop FF1 and a forcible OFF circuit 320. The first flip-flop FF1 is a set-reset (SR) flip-flop which receives the set signal S11 at a set terminal thereof and receives the reset signal S12a at a reset terminal (inverted logic) thereof to output the control pulse $S_{CNT}$. The set signal S11 is a positive logic, and thus, it is asserted at a high level; and the reset signal S12a is a negative logic, and thus, it is asserted at a low level.

The forcible OFF circuit 320 receives the control pulse $S_{CNT}$ and the release signal S13, and forcibly fixes a reset signal S12a to an asserted state (a low level) until the release signal S13 is asserted after the control pulse $S_{CNT}$ transitions to an OFF level (a low level).

Figure 2:
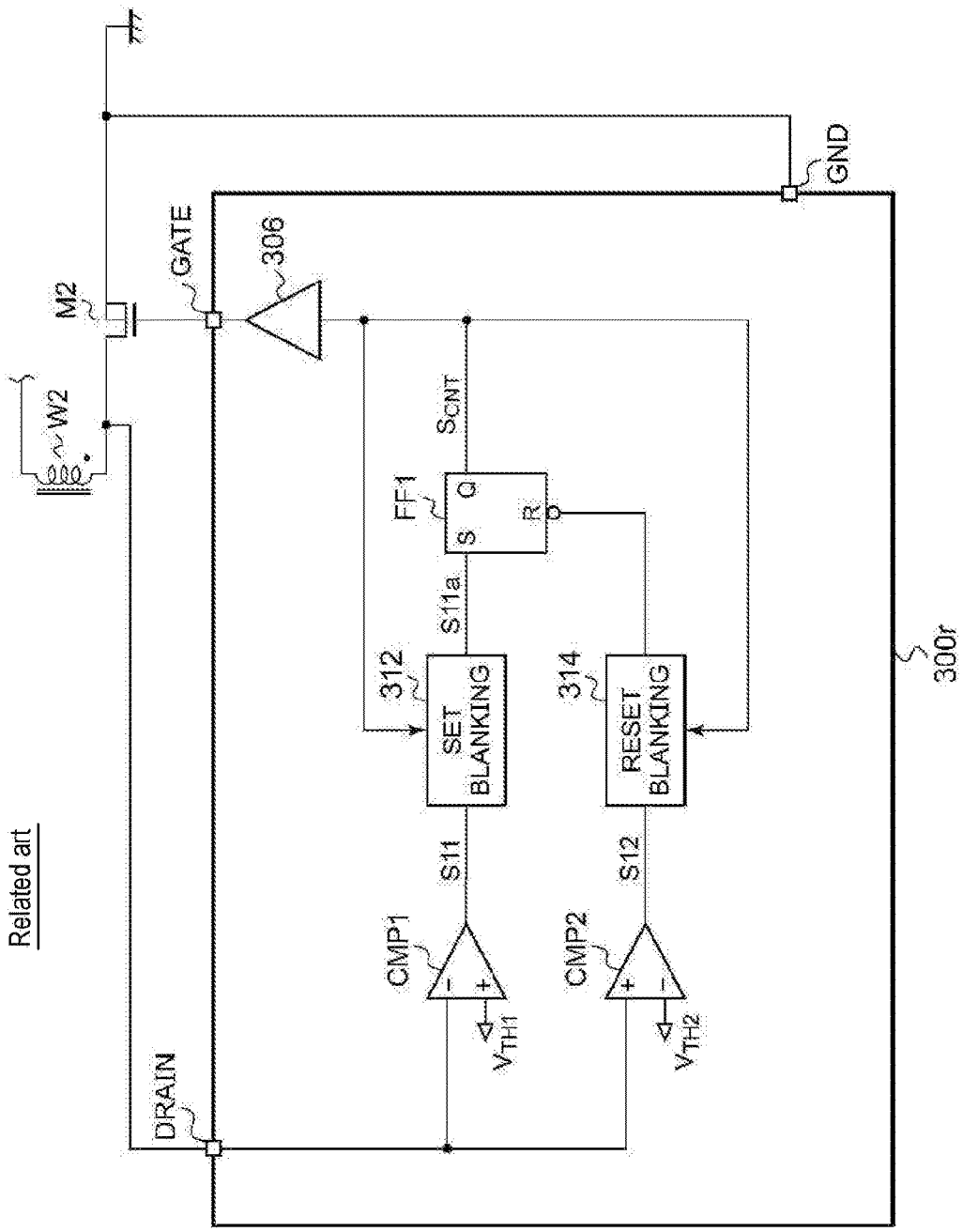
FIG. 2 is a circuit diagram of a synchronous rectifying controller reviewed by the present inventors.
Figure 3:
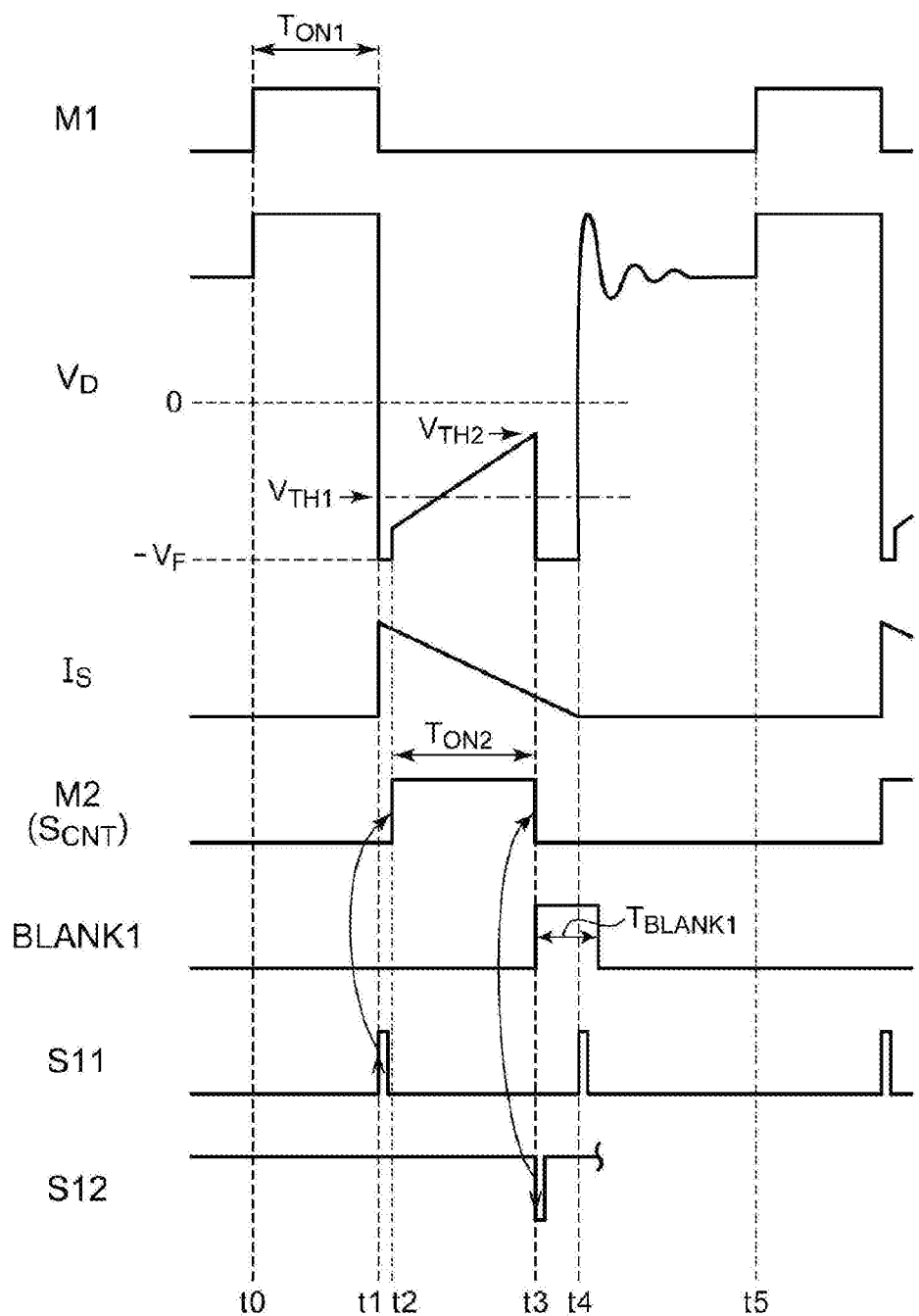
FIG. 3 is an operational waveform view of a synchronous rectifying controller in a discontinuous mode.
Figure 4:
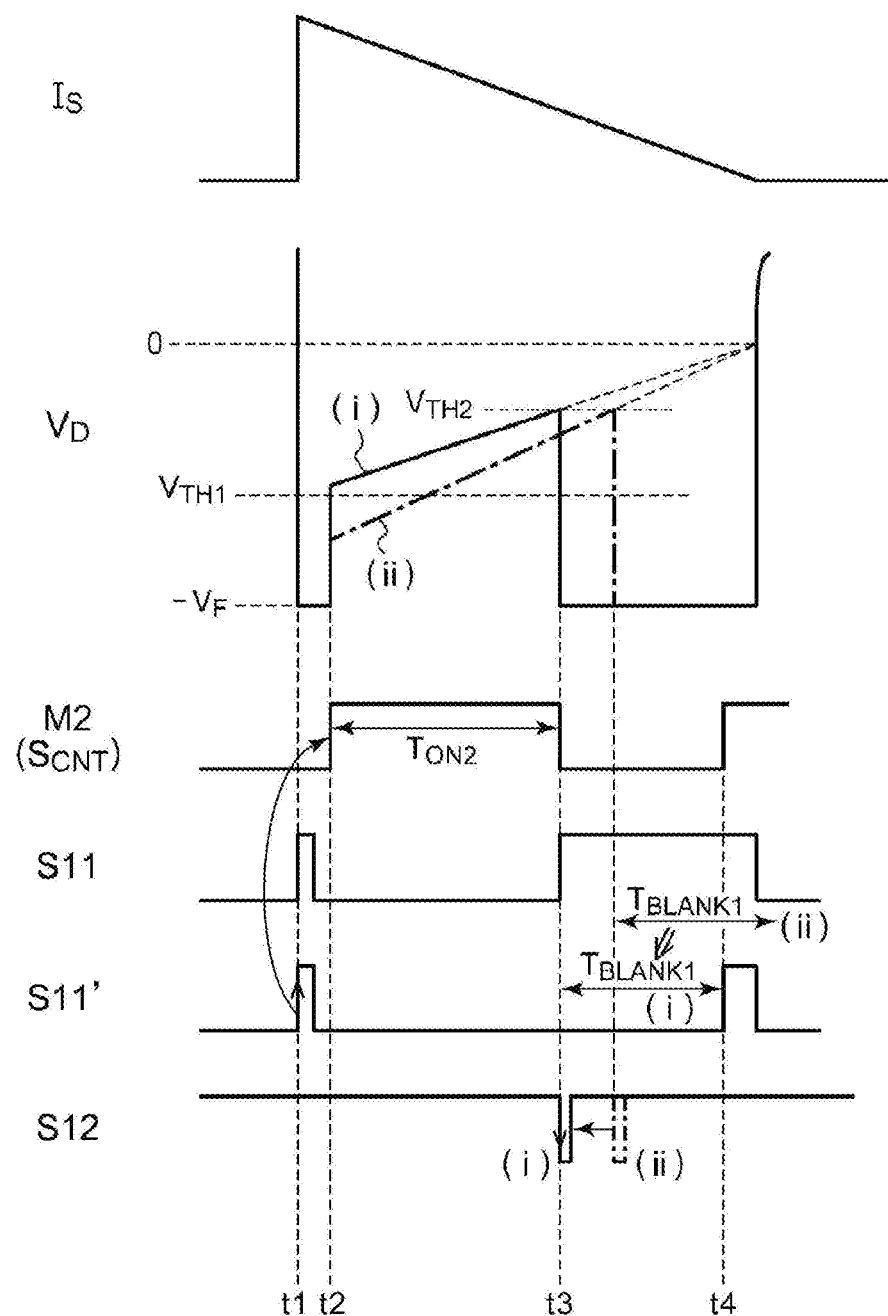
FIG. 4 is an operational waveform view of a synchronous rectifying controller when an ON resistance of a synchronous rectifying transistor is small.

Further, in the synchronous rectifying controller 300 of FIG. 5, the functions of the first blanking circuit 312 and the second blanking circuit 314 of FIG. 2 are not essential.

Figure 6:
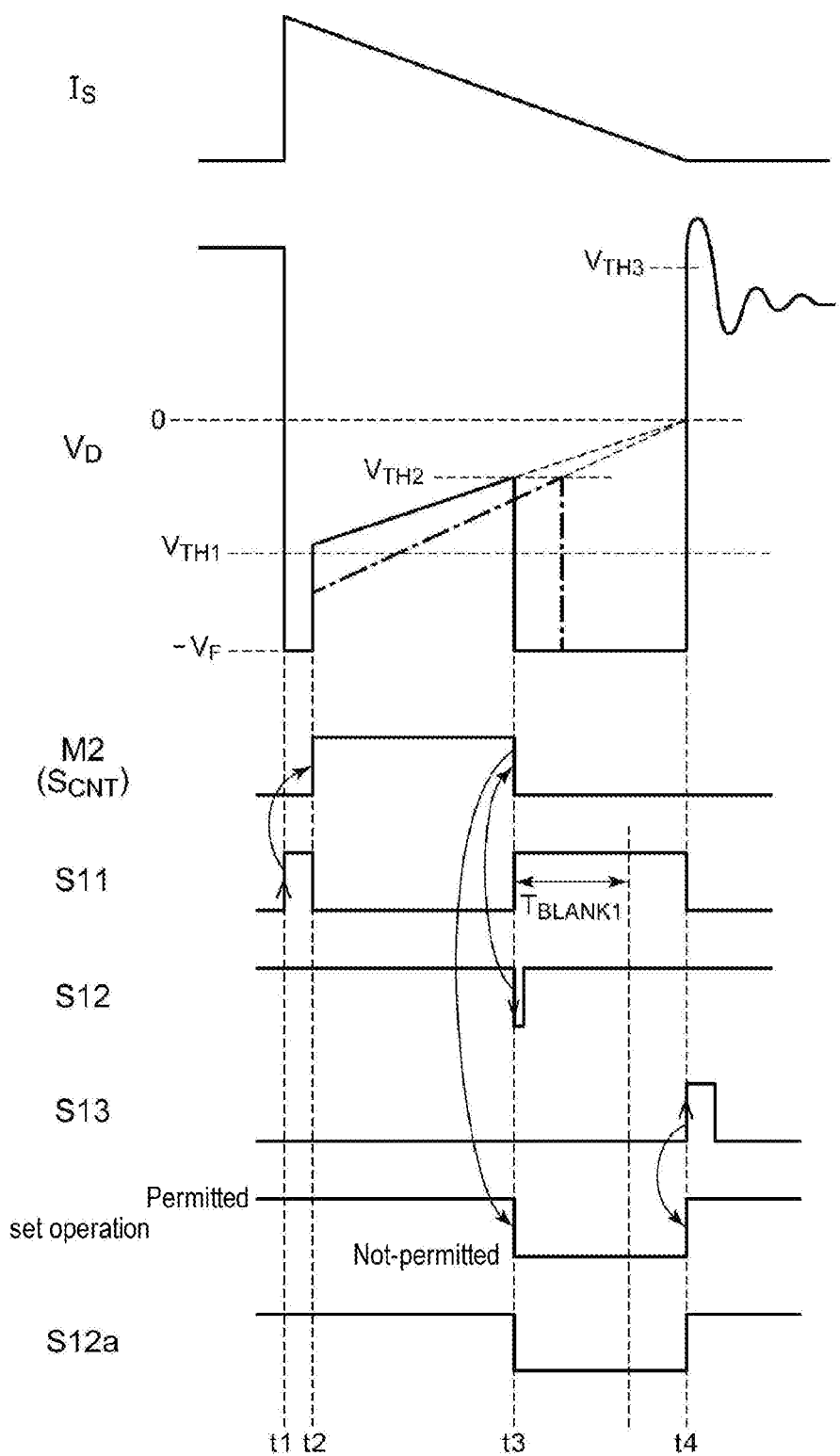
FIG. 6 is an operational waveform view of the synchronous rectifying controller of FIG. 5.

The basic configuration of the synchronous rectifying controller 300 has been described above. Next, an operation thereof will be described. FIG. 6 is an operational waveform view of the synchronous rectifying controller 300 of FIG. 5. FIG. 6 illustrates an operation when the ON resistance $R_{ON2}$ of the synchronous rectifying transistor M2 is small.

When the switching transistor M1 is turned off at a time ti, the drain voltage $V_D$ is dropped to $-V_F$ and the set signal S11 is asserted. In response to the assertion of the set signal S11, the control pulse $S_{CNT}$ has a high level and the synchronous rectifying transistor M2 is turned on at a time t2.

When the drain voltage $V_D$ exceeds the second threshold voltage $V_{TH2}$ at a time t3, the reset signal S12 is asserted (a low level), and thus, the control pulse $S_{CNT}$ transitions to a low level. When the control pulse $S_{CNT}$ transitions to a low level, the set operation of the first flip-flop FF1 is inhibited.

Specifically, even after the reset signal S12 is negated (a high level), the reset signal S12a to the first flip-flop FF1 is fixed to an asserted state (a low level). When a reset dominant flip-flop is used, the set signal S11 is negated while the reset signal S12a is asserted. Thus, the synchronous rectifying transistor M2 is not turned on again.

And then, when the secondary current $I_S$ becomes completely zero at a time t4, the drain voltage $V_D$ jumps to exceed the third threshold voltage $V_{TH3}$ to assert the release signal S13. Accordingly, the reset signal S12a is negated and the set operation of the first flip-flop FF1 is permitted.

According to this synchronous rectifying controller 300, the synchronous rectifying transistor M2 is inhibited from being turned on during the time from t3 to t4. Thus, it is possible to prevent a second turn-on of the synchronous rectifying transistor M2 after the first blanking period $T_{BLANK1}$ lapses.

The present disclosure is recognized by the block diagram and circuit diagram of FIG. 5, and encompasses various devices and circuits derived from the above description and is not limited to a specific configuration. Hereinafter, a more specific configuration example will be described in order to help and clarify understanding of the essence and circuitry operation of the present disclosure, rather than to narrow the scope of the present disclosure.

Figure 7:
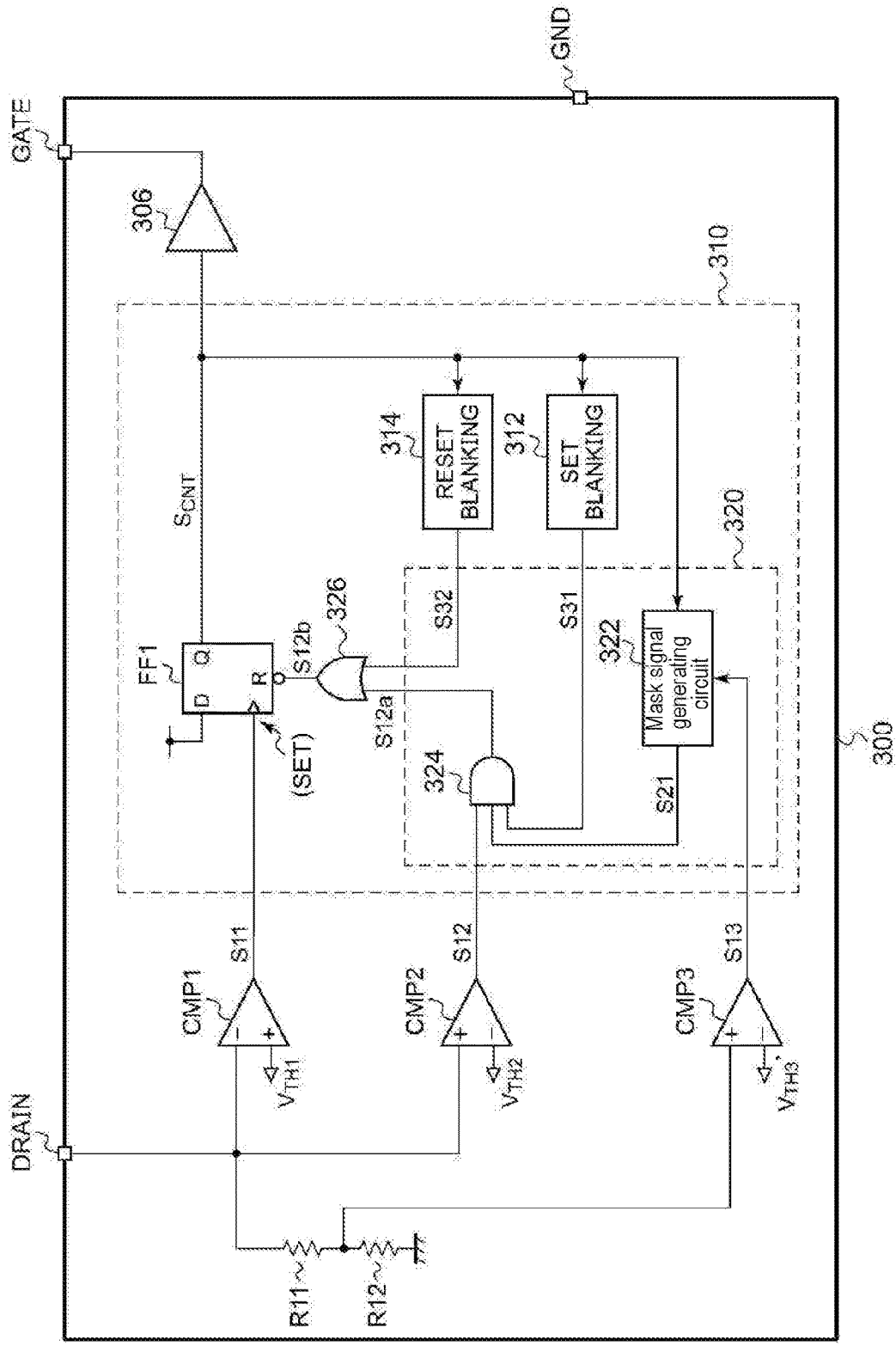
FIG. 7 is a circuit diagram illustrating a specific configuration example of the synchronous rectifying controller.

FIG. 7 is a circuit diagram illustrating a specific configuration example of the synchronous rectifying controller 300. The forcible OFF circuit 320 includes a mask signal generating circuit 322 and a logic gate 324.

The mask signal generating circuit 322 generates a mask signal S21 depending on the control pulse $S_{CNT}$ and the release signal S13. The mask signal S21 has a first level (an asserted state, a low level) depending on a negative edge of the control pulse $S_{CNT}$, and has a second level (a negated state, a high level) depending on the assertion of the release signal S13.

The logic gate 324 receives the mask signal S21 and the reset signal S12 and outputs a result obtained by logically operating them to a reset terminal of the first flip-flop FP1. For example, the logic gate 324 is configured to assert an output thereof when at least one of the reset signal S12 and the mask signal S21 is asserted. The reset terminal of the first flip-flop FF1 is a negative logic system, and thus, the logic gate 324 may be configured as an AND gate. Also, the first flip-flop FF1 of FIG. 7 is a D flip-flop and is equivalent to that of FIG. 5.

The control circuit 310 includes a first blanking circuit 312 for setting and a second blanking circuit 314 for resetting, in addition to the first flip-flop FF1 and the forcible OFF circuit 320. After the control pulse $S_{CNT}$ transitions to an OFF level, the first blanking circuit 312 forcibly fixes the reset signal S12 to an asserted state (a low level) during a predetermined first blanking time $T_{BLANK1}$. For example, the first blanking circuit 312 may generate a first blanking signal S31 asserted (a low level) during the first blanking period $T_{BLANK1}$, and the logic gate 324 may generate a logical product (i.e., AND operation) of the reset signal S12, the mask signal S21, and the first blanking signal S31.

Also, the first blanking circuit 312 may be installed between the first comparator CMP1 and the first flip-flop FF1, like the first blanking circuit 312 of FIG. 2. In this case, after the control pulse $S_{CNT}$ transitions to an OFF level, the first blanking circuit 312 may forcibly fix the set signal S11 to a negated state during the first blanking time $T_{BLANK1}$.

After the control pulse $S_{CNT}$ transitions to an ON level, the second blanking circuit 314 forcibly fixes the reset signal S12 to a negated state (a high level) during a predetermined second blanking time $T_{BLANK2}$. For example, the second blanking circuit 314 may generate a second blanking signal S32 negated (a high level) during the second blanking period $T_{BLANK2}$ and the logic gate 326 may generate a logical sum S12b (i.e., OR operation) of the reset signal S12a and the second blanking signal S32.

Figure 8:
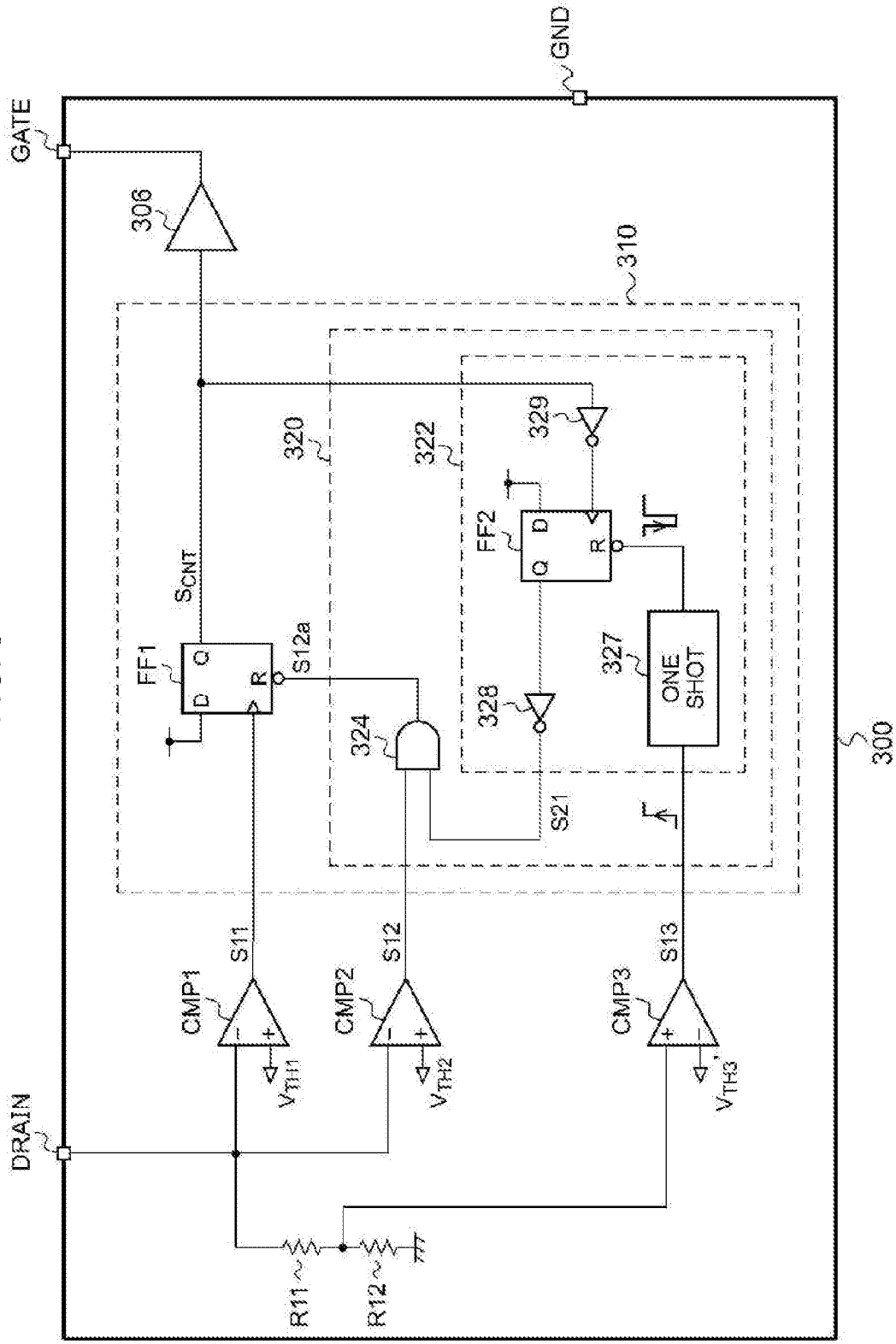
FIG. 8 is a circuit diagram of the synchronous rectifying controller.

FIG. 8 is a circuit diagram of the synchronous rectifying controller 300. The mask signal generating circuit 322 of FIG. 8 includes a one shot circuit 327, inverters 328 and 329, and a second flip-flop FF2.

The second flip-flop FF2 is set depending on a negative edge of the control pulse $S_{CNT}$, and reset depending on the release signal S13. The inverter 328 inverts an output from the second flip-flop FF2 to output a mask signal S21. For example, the second flip-flop FF2 may include a D flip-flop, and the inverter 329 may supply an inverted signal of the release signal S13 to a clock terminal of the D flip-flop. The one shot circuit 327 generates a pulse having a low level during a predetermined period in response to the assertion (positive edge) of the release signal S13 and outputs the generated pulse to a reset terminal (inverted logic) of the second flip-flop FF2.

The configuration of the synchronous rectifying controller 300 according to the first embodiment has been described above. Next, an operation thereof will be described. FIG. 9 is an operational waveform view of the synchronous rectifying controller 300 of FIGS. 7 and 8. Thus, according to the synchronous rectifying controller 300 of FIGS. 7 and 8, it is possible to prevent the synchronous rectifying transistor M2 from being turned on twice.

Next, modifications of the first embodiment will be described.

(First Modification)

Figure 10A:
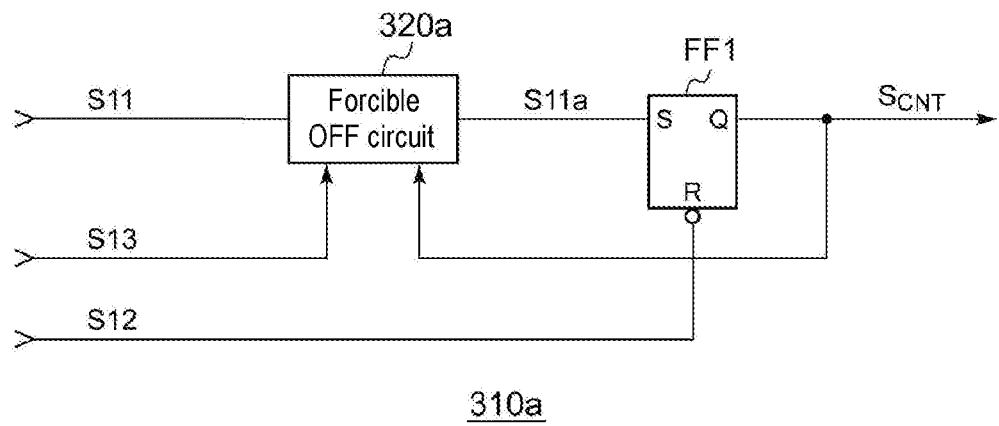
FIGS. 10A and 10B are circuit diagrams of a control circuit according to a first modification.
Figure 10B:
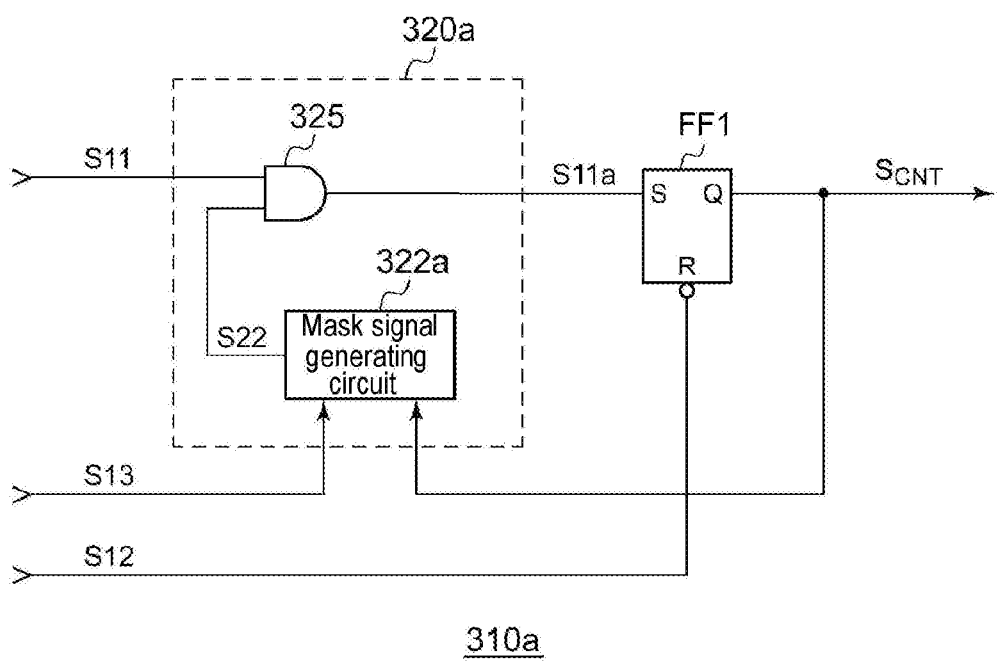

The configuration for inhibiting and negating the set operation in the control circuit 310 is not limited to that of FIG. 5. FIGS. 10A and 10B are circuit diagrams of a control circuit 310a according to a first modification. In the first modification, a forcible OFF circuit 320a acts on the set signal S11 to inhibit a set operation of the control circuit 310a. Specifically, the forcible OFF circuit 320a receives the control pulse $S_{CNT}$ and the release signal S13 and forcibly fixes the set signal S11a to a negated state (a low level) until the release signal S13 is asserted after the control pulse $S_{CNT}$ transitions to an OFF level (a low level).

As illustrated in FIG. 10B, the forcible OFF circuit 320a may include a logic gate 325 and a mask signal generating circuit 322a.

The mask signal generating circuit 322a of the forcible OFF circuit 320a generates a mask signal S22 depending on the control pulse $S_{CNT}$ and the release signal S13. The mask signal S22 has a first level (a negated state, a low level) in response to a negative edge of the control signal $S_{CNT}$ and has a second level (an asserted state, a high level) in response to the assertion of the release signal S13.

The logic gate 325 receives the mask signal S22 and the set signal S11 and outputs a signal S11a indicating a result obtained by logically operating them to the set terminal of the first flip-flop FF1. For example, the logic gate 325 is configured to assert an output thereof when both the set signal S11 and the mask signal S22 are asserted, and the logic gate 325 may include, for example, an AND gate.

Second Embodiment

Figure 11:
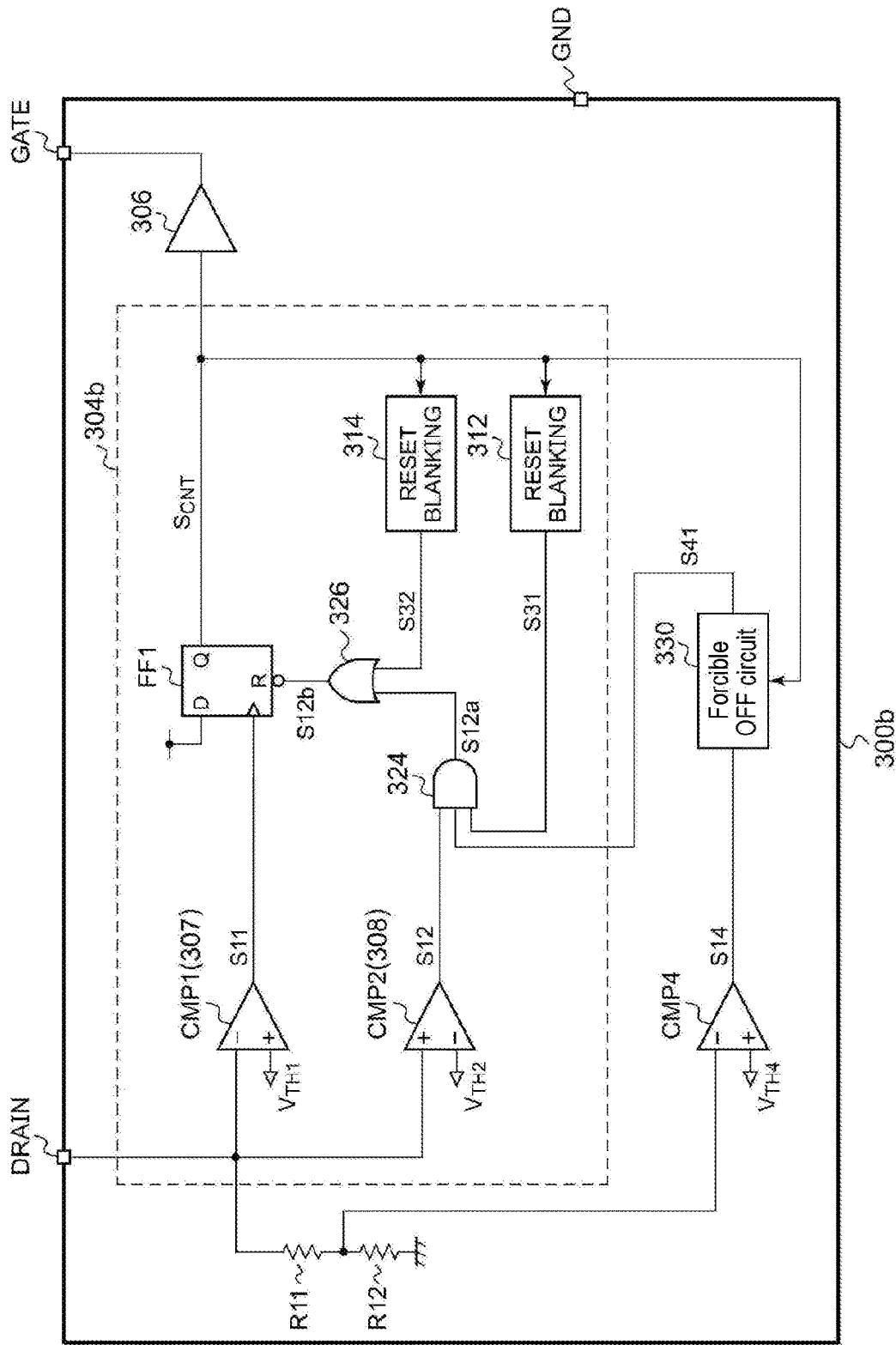
FIG. 11 is a circuit diagram of a synchronous rectifying controller according to a second embodiment.

FIG. 11 is a circuit diagram of a synchronous rectifying controller 300b according to a second embodiment. The synchronous rectifying controller 300b has a pulse generator 304b, a driver 306, a forcible OFF circuit 330, and a fourth comparator CMP4.

The pulse generator 304b generates a control pulse $S_{CNT}$ based on a voltage $V_{DS}$ (i.e., a drain voltage $V_D$) across the synchronous rectifying transistor M2. When it is detected that the switching transistor M1 is turned off, the pulse generator 304b adjusts the control pulse $S_{CNT}$ to have an ON level, and when it is detected that the current $I_S$ of the secondary winding W2 of the transformer T1 becomes substantially zero, the pulse generator 304b adjusts the control pulse $S_{CNT}$ to have an OFF level. The driver 306 switches the synchronous rectifying transistor M2 depending on the control pulse $S_{CNT}$. The basic configuration of the pulse generator 304b is the same as that of the pulse generator 304 of the first embodiment.

When it is detected that the switching transistor M1 is turned on, the forcible OFF circuit 330 starts to measure time, and after a predetermined time-up period $T_{UP}$ lapses or when the synchronous rectifying transistor M2 is turned off, the forcible OFF circuit 330 shifts to a forcible OFF state where the synchronous rectifying transistor M2 is forcibly turned off.

The fourth comparator CMP4 compares the drain voltage $V_D$ of the synchronous rectifying transistor M2 with a fourth positive threshold voltage $V_{TH4}$, and when the drain voltage $V_D$ exceeds the fourth threshold voltage $V_{TH4}$, the fourth comparator CMP4 asserts a detection signal S14 (for example, a low level). The fourth threshold voltage $V_{TH4}$ is determined to be, for example, about $V_{CC} \times 1.4$ higher than the source voltage $V_{CC}$.

When the detection signal S14 is asserted, the forcible OFF circuit 330 starts to measure time, and after a time-up period $T_{UP}$ lapses, the forcible OFF circuit 330 asserts the forcible OFF signal S41 (a low level). Also, the forcible OFF circuit 330 asserts the forcible OFF signal S41 when the synchronous rectifying transistor M2 is turned off. The forcible OFF signal S41 is input to the logic gate 324. Thus, when at least one of the reset signal S12 and the forcible OFF signal S41 is asserted, the first flip-flop FF1 transitions the control pulse $S_{CNT}$ to an OFF level.

The configuration of the synchronous rectifying controller 300b according to the second embodiment has been described above. Next, an operation thereof will be described.

Figure 12:
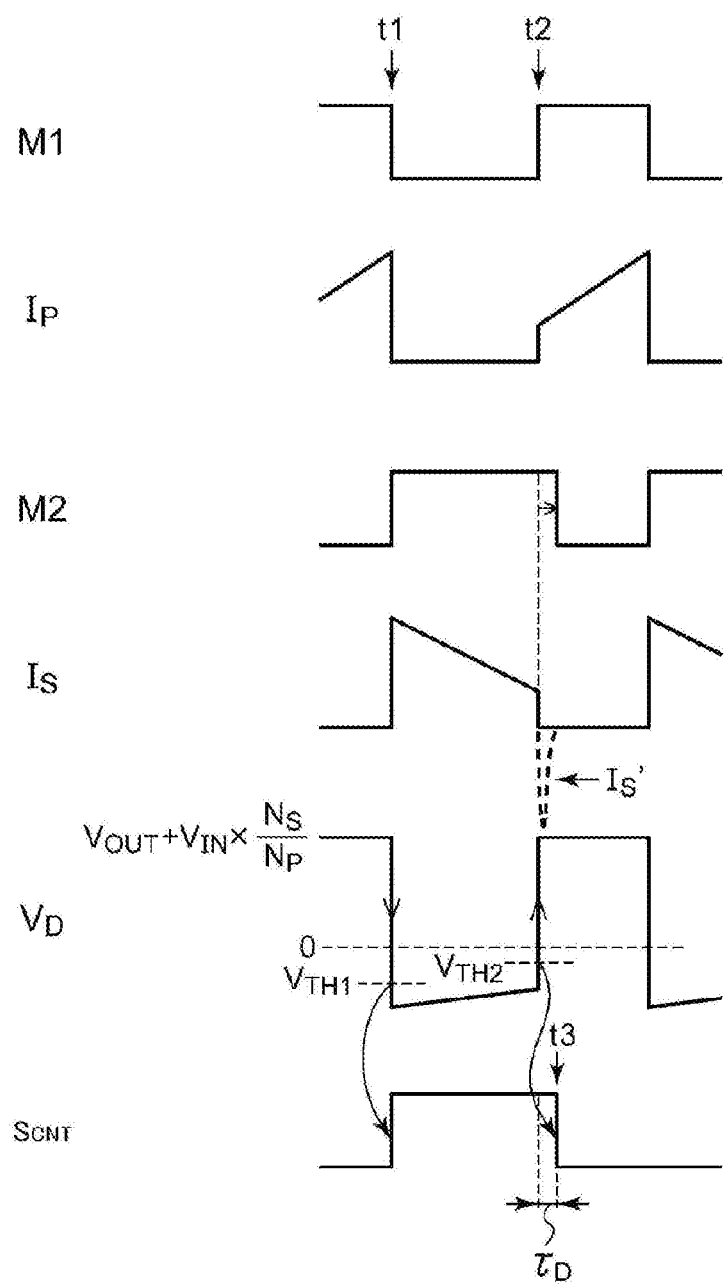
FIG. 12 is an operational waveform view of the related art synchronous rectifying controller in a continuous mode.

In order to clarify the technical significance of the forcible OFF circuit 330, an operation and a problem when the forcible OFF circuit 330 is not installed will be described. FIG. 12 is an operational waveform view of the related art synchronous rectifying controller 300r in a continuous mode.

Before a time t1, the switching transistor M1 is in an ON state and the drain voltage $V_D$ of the synchronous rectifying transistor M2 is $V_{OUT}+V_{IN}\times N_S/N_p$. When the switching transistor M1 is turned off at the time ti, the secondary current $I_S$ starts to flow through the secondary winding W2 and the drain voltage $V_D$ becomes negative. The synchronous rectifying controller 300r detects that the drain voltage $V_D$ downwardly crosses the first threshold voltage $V_{TH1}$, and adjusts the control pulse $S_{CNT}$ to have an ON level to turn on the synchronous rectifying transistor M2.

During the ON period of the synchronous rectifying transistor M2, an absolute value of the drain voltage $V_D$ is reduced together with a reduction in the secondary current $I_S$. When the switching transistor M1 is turned on at a time t2, the secondary current $I_S$ becomes zero and the drain voltage $V_D$ jumps again to $V_{OUT}+V_{IN}\times N_S/N_p$. When the drain voltage $V_D$ upwardly crosses the second threshold voltage $V_{TH2}$, the synchronous rectifying controller 300r adjusts the control pulse $S_{CNT}$ to have an OFF level to turn off the synchronous rectifying transistor M2.

Here, there is a certain delay $\tau_D$p until a time t3 at which the control pulse $S_{CNT}$ transitions to the OFF level and the synchronous rectifying transistor M2 is turned off after the drain voltage $V_D$ crosses the threshold voltage $V_{TH2}$ at the time t2. The synchronous rectifying transistor M2 is turned on during the delay $\tau_D$, and here, since the high voltage $V_D$ is generated between both ends of the synchronous rectifying transistor M2 although impedance of the synchronous rectifying transistor M2 is very small, a large current (broken line $I_S'$) may flow through the synchronous rectifying transistor M2.

Further, during the delay time $\tau_D$, the large current $I_S'$ flowing through the synchronous rectifying transistor M2 passes through the secondary winding W2. When the synchronous rectifying transistor M2 is turned off at the time t3, the current $I_S'$ flowing through the secondary winding W2 is shut off, generating a high voltage $Vx=dI_S'/dt$ between both ends thereof. This high voltage Vx induces $Vy=-Vx\times N_P/N_S$ across the primary winding W1. When the voltage Vy is applied to the switching transistor M1, the reliability of the switching transistor M1 may be affected.

Figure 13:
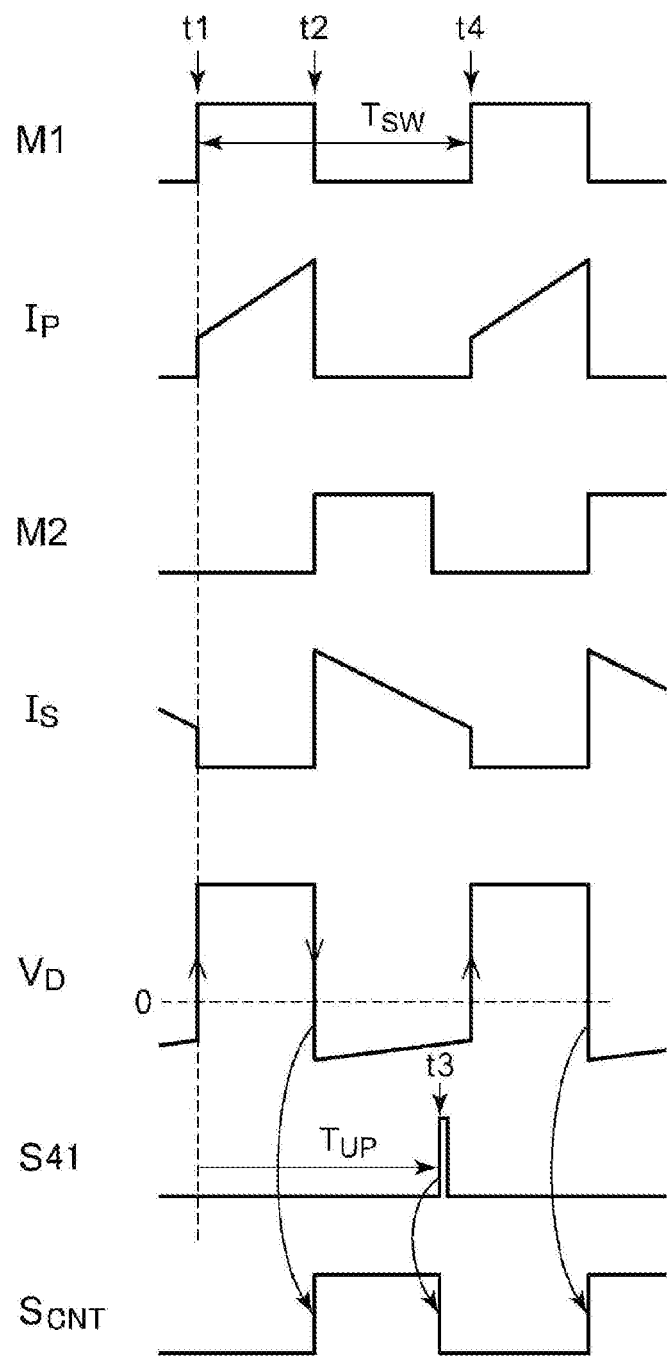
FIG. 13 is an operational waveform view of the synchronous rectifying controller of FIG. 11 in a continuous mode.

Next, an operation of the synchronous rectifying controller 300b according to the second embodiment will be described. FIG. 13 is an operational waveform view of the synchronous rectifying controller 300b of FIG. 11 in a continuous mode. The switching transistor M1 is turned on at a time ti. When the switching transistor M1 is turned on, the forcible OFF circuit 330 starts to measure time, and after the time-up period $T_{UP}$ lapses, a forcible OFF signal S41 is asserted. Here, since $T_{UP}<T_{SW}$, the control pulse $S_{CNT}$ has an OFF level prior to a time t4 at which the switching transistor M1 is turned on at a next cycle, turning off the synchronous rectifying transistor M2.

According to this synchronous rectifying controller 300b, as illustrated in FIG. 13, since the synchronous rectifying transistor M2 is turned off before the switching transistor M1 is turned on in the continuous mode, a problem that arises in the continuous mode may be solved. Through this control, there is no need to supply a timing signal indicating turn-on of the switching transistor M1 from the primary side controller 202 to the synchronous rectifying controller 300, eliminating the necessity of an additional component such as a photocoupler or a capacitor required for transmission of the timing signal and being also advantageous in terms of cost.

Figure 14:
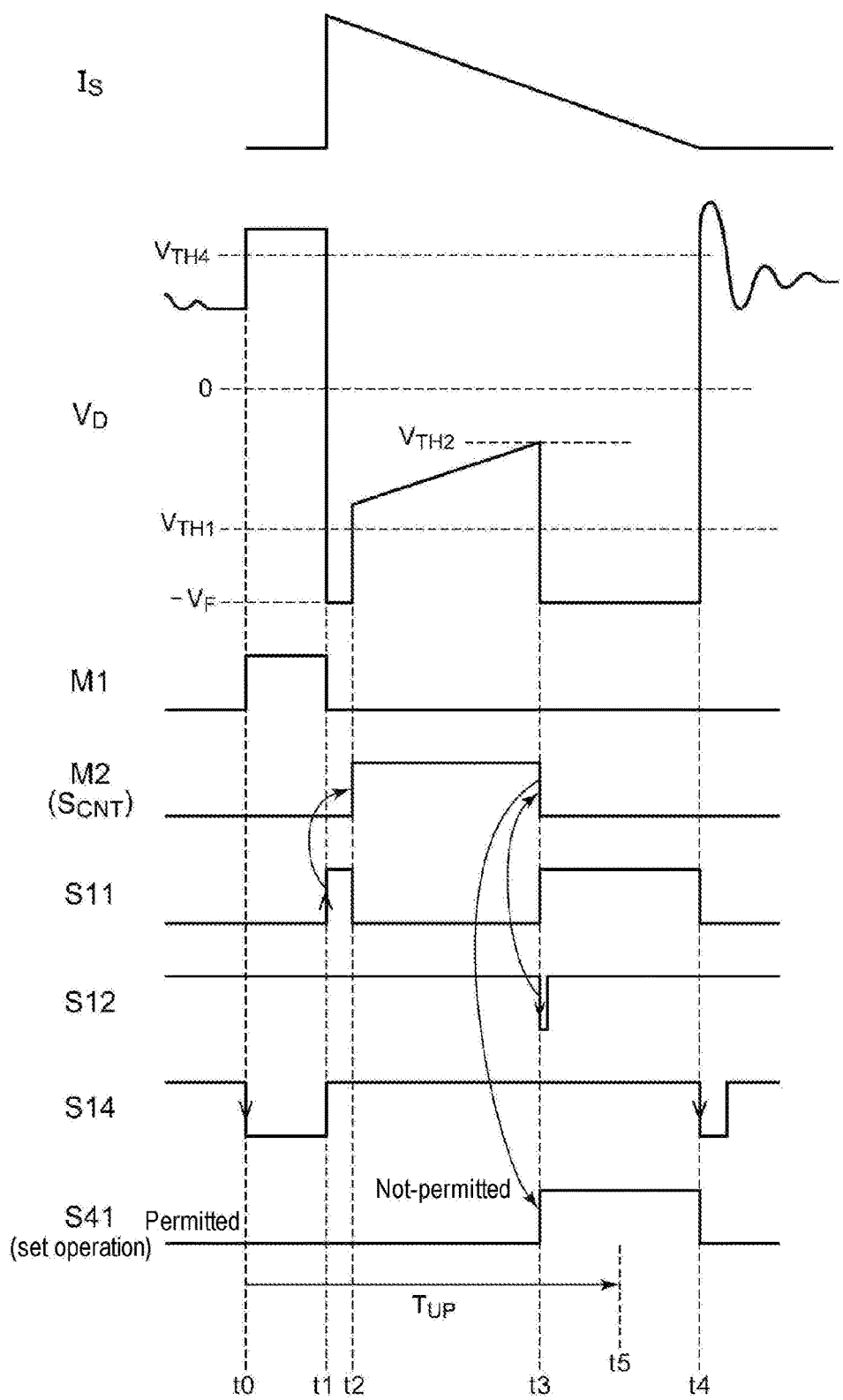
FIG. 14 is an operational waveform view of the synchronous rectifying controller of FIG. 11 in a discontinuous mode.

FIG. 14 is an operational waveform of the synchronous rectifying controller 300b of FIG. 11 in a discontinuous mode. FIG. 14 illustrates an operation when the ON resistance $R_{ON2}$ of the synchronous rectifying transistor M2 is small. When the switching transistor M1 is turned on at a time t0, the drain voltage $V_D$ jumps to assert the detection signal S14. An operation of measuring a time of the forcible OFF circuit 330 starts from that time. When the control pulse $S_{CNT}$ transitions to a low level at a time t3, the forcible OFF signal S41 is asserted to inhibit the set of the first flip-flop FF1. Thus, the synchronous rectifying transistor M2 is not turned on again.

And then, when the secondary current $I_S$ becomes completely zero at a time t4, the drain voltage $V_D$ jumps to exceed the fourth threshold voltage $V_{TH4}$ to assert the detection signal S14. Thus, the forcible OFF signal S41 is negated to permit the set operation of the first flip-flop FF1.

According to this synchronous rectifying controller 300, turn-on of the synchronous rectifying transistor M2 during the time of t3 to t4 is inhibited. Thus, it is possible to inhibit a second turn-on of the synchronous rectifying transistor M2 after the time-up period $T_{UP}$ lapses.

Figure 15:
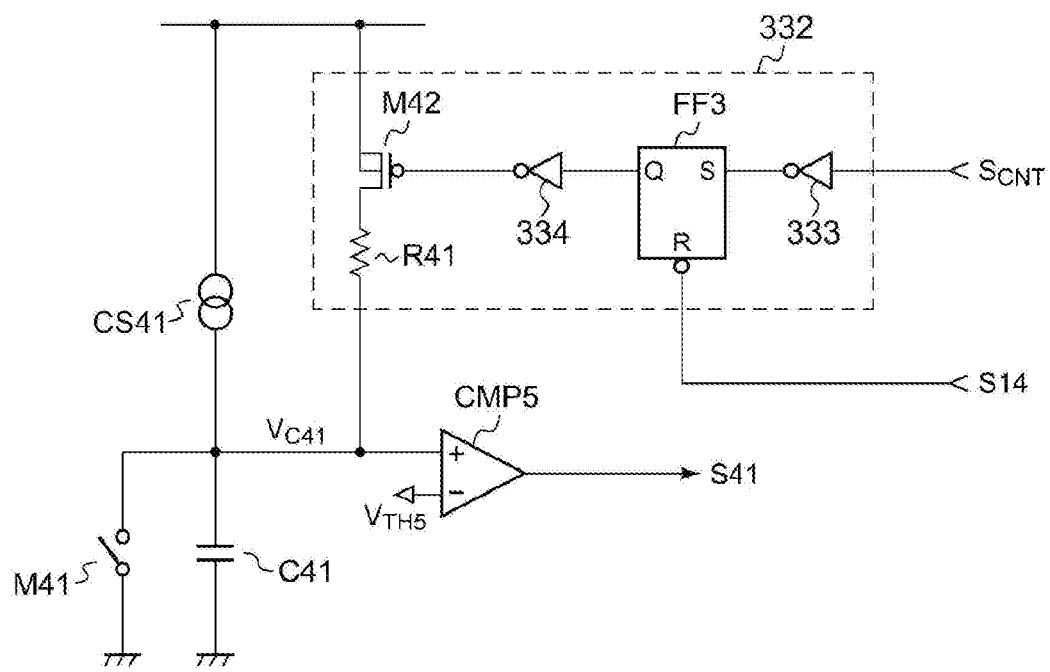
FIG. 15 is a circuit diagram illustrating a configuration example of a forcible OFF circuit.

FIG. 15 is a circuit diagram illustrating a configuration example of the forcible OFF circuit 330. The forcible OFF circuit 330 includes a capacitor C41, a current source CS41, a fifth comparator CMP5, and a pull-up circuit 332.

One end of the capacitor C41 is grounded. A discharge switch M41 is connected in parallel to the capacitor C41. The current source CS41 charges the capacitor C41. The fifth comparator CMP5 compares a voltage $V_{C41}$ of the capacitor C41 with a predetermined fifth threshold voltage $V_{TH5}$. The fifth threshold voltage $V_{TH5}$ defines a length of the time-up period $T_{UP}$. The pull-up circuit 332 pulls up the voltage $V_{C41}$ of the capacitor C41 to a voltage higher than the fifth threshold voltage $V_{TH5}$ when the synchronous rectifying transistor M2 is turned off. The pull-up circuit 332 includes, for example, inverters 333 and 334, a third flip-flop FF3, a transistor M42, and a resistor R41. The control pulse $S_{CNT}$ inverted by the inverter 333 is input to a set terminal of the third flip-flop FF3 and set in response to a negative edge of the control pulse $S_{CNT}$. Also, the detection signal S14 is input to a reset terminal (inverted logic) of the third flip-flop FF3 and the third flip-flop FF3 is reset when the detection signal S14 is asserted (a low level). An output from the third flip-flop FF3 is inverted by the inverter 334 and input to a gate of the transistor M42.

The discharge switch M41 is turned on before the forcible OFF circuit 330 starts to measure time, to make the voltage $V_{C41}$ become zero. When the discharge switch M41 is turned off simultaneously when time starts to be measured, the capacitor C41 is charged by the current Ic and the voltage $V_{C41}$ is increased over time. And then, when the voltage $V_{C41}$ exceeds the fifth voltage $V_{TH5}$ after the time-up period $T_{UP}$ lapses since time was started to be measured, the forcible OFF signal S41 is asserted.

Further, when the synchronous rectifying transistor M2 is turned off before the time-up period $T_{UP}$ lapses since time was started to be measured, the transistor M42 is turned on, the voltage $V_{C41}$ is pulled up, and the forcible OFF signal S41 is asserted.

Next, modifications of the second embodiment will be described.

(Second Modification)

At least one of the first blanking circuit 312 and the second blanking circuit 314 may be omitted. Further, the configuration of the pulse generator 304b is not limited to that of FIG. 11.

(Third Modification)

The forcible OFF circuit 330 may be configured as a digital timer circuit.

(Applications)

Next, the applications of the DC/DC converter 200 described in the embodiments will be described.

FIG. 16 is a view illustrating an AC adapter 800 having an AC/DC converter 100. The AC adapter 800 has a plug 802, a housing 804, and a connector 806. The plug 802 receives a commercial AC voltage $V_{AC}$ from an electric outlet (not shown). The AC/DC converter 100 is mounted within the housing 804. A DC output voltage $V_{OUT}$ generated by the AC/DC converter 100 is supplied from the connector 806 to an electronic device 810. The electronic device 810 may be, for example, a notebook PC, a digital camera, a digital video camera, a mobile phone, a portable audio player, or the like.

Figure 17A:
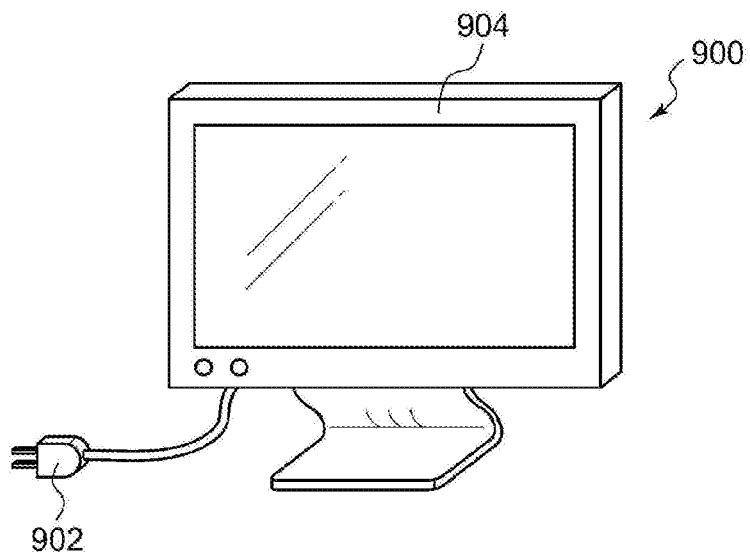
FIGS. 17A and 17B are views illustrating an electronic device having an AC/DC converter.
Figure 17B:
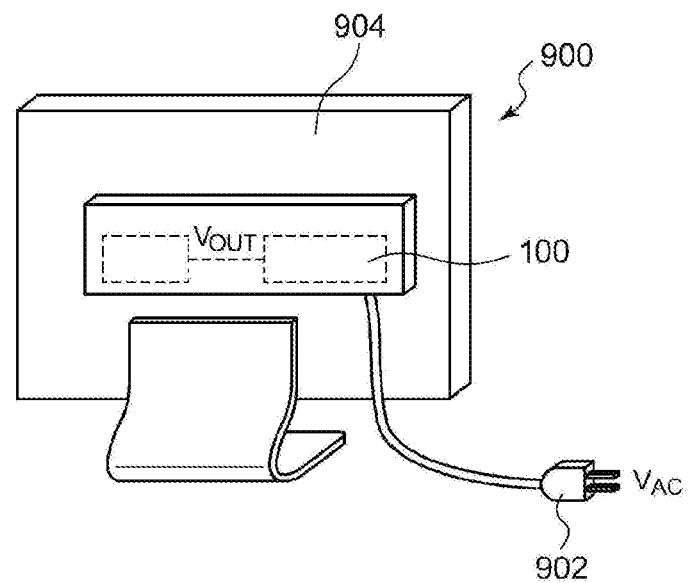

FIGS. 17A and 17B are views illustrating an electronic device 900 having an AC/DC converter 100. The electronic device 900 of FIGS. 17A and 17B is a display device, but the type of the electronic device 900 is not particularly limited and the electronic device 900 may be any device including a power supply, such as an audio device, a refrigerator, a washing machine, or a cleaner.

The plug 902 receives a commercial AC voltage $V_{AC}$ from an electric outlet (not shown). The AC/DC converter 100 is mounted within a housing 904. A DC output voltage $V_{OUT}$ generated by the AC/DC converter 100 is supplied to a load such as a microcomputer, a digital signal processor (DSP), a power circuit, a lighting device, an analog circuit, or a digital circuit mounted within the same housing 904.

The present disclosure has been described above with reference to the embodiments. It is to be understood by those skilled in the art that the embodiments are merely illustrative and may be variously modified by any combination of the components or processes, and the modifications are also within the scope of the present disclosure. Hereinafter, these modifications will be described.

(Fourth Modification)

Figure 18:
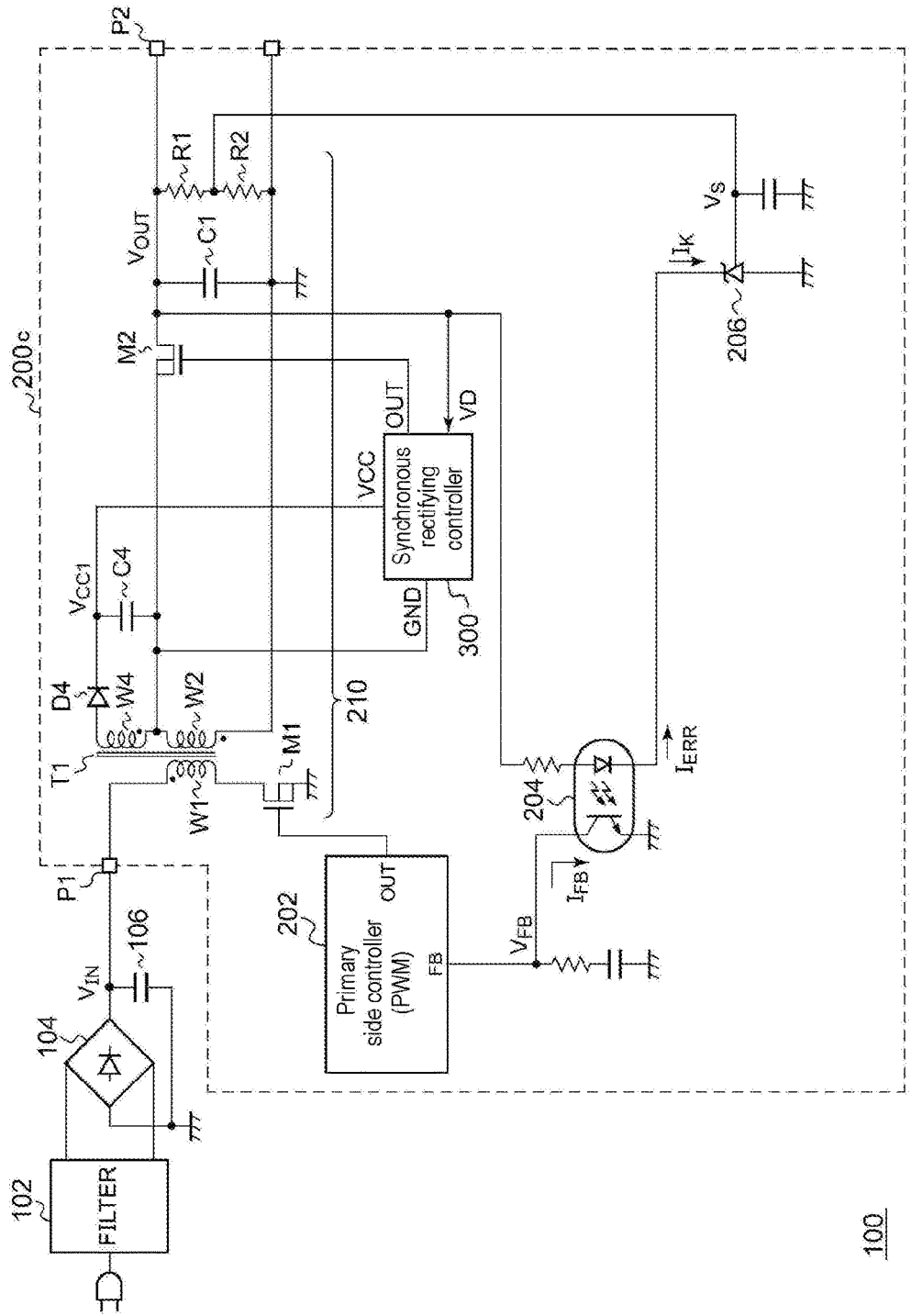
FIG. 18 is a circuit diagram of a DC/DC converter according to a fourth modification.

In the embodiments, the case in which the synchronous rectifying transistor M2 is disposed on a lower potential side than the primary winding W1 has been described, but the synchronous rectifying transistor M2 may also be disposed to be adjacent to an output terminal P2. FIG. 18 is a circuit diagram of a DC/DC converter 200c according to a fourth modification. An auxiliary winding W4 of a transformer T1, a diode D4, and a capacitor C4 form an auxiliary converter and generate a DC voltage $V_{CC1}$ higher than an output voltage $V_{OUT}$. The DC voltage $V_{CC1}$ is supplied to a VCC terminal. A GND terminal of the synchronous rectifying controller 300 is connected to a source of the synchronous rectifying transistor M2. The configuration of the synchronous rectifying controller 300 is the same as that of the embodiments. This modification may also obtain the same effects as those of the embodiments.

(Fifth Modification)

In the embodiments, the flyback converter has been described, but the present disclosure may also be applied to a forward converter. In this case, a plurality of synchronous rectifying transistors is disposed on the secondary side of the transformer T1. The synchronous rectifying controller may be configured to switch the plurality of synchronous rectifying transistors. Further, the converter may be a pseudo-resonance type converter.

(Sixth Modification)

At least one of the switching transistor and the synchronous rectifying transistor may be a bipolar transistor or IGBT.

(Seventh Modification)

The setting of logic values of an assertion, a negation, a high level, or a low level described in the embodiments is provided as an example, and may be freely changed by those skilled in the art.

According to some embodiments of the present disclosure, it is possible to prevent a synchronous rectifying transistor from being turned on twice.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A synchronous rectifying controller disposed on a secondary side of an insulating synchronous rectifying DC/DC converter to control a synchronous rectifying transistor, comprising:
   a pulse generator configured to generate a control pulse based on a voltage across the synchronous rectifying transistor, and to adjust the control pulse to have an ON level indicating ON of the synchronous rectifying transistor when it is detected that a switching transistor at a primary side of the DC/DC converter is turned off and adjust the control pulse to have an OFF level indicating OFF of the synchronous rectifying transistor when it is detected that a current of a secondary winding of a transformer becomes substantially zero;
   a driver configured to switch the synchronous rectifying transistor depending on the control pulse; and
   a forcible OFF circuit configured to start to measure time when it is detected that the switching transistor is turned on, and after a predetermined time-up time lapses or when the synchronous rectifying transistor is turned off, configured to shift to a forcible OFF state where the synchronous rectifying transistor is forcibly turned off.

2. The controller of claim 1, further comprising a fourth comparator configured to compare a drain voltage of the synchronous rectifying transistor with a fourth positive threshold voltage,
   wherein the forcible OFF circuit is configured to start to measure time when the drain voltage exceeds the fourth threshold voltage.

3. The controller of claim 1, wherein the pulse generator comprises:
  a set signal generating part configured to generate a set signal asserted when it is detected that the switching transistor is turned off;
  a reset signal generating part configured to generate a reset signal asserted when it is detected that the current of a secondary winding of the transformer becomes substantially zero; and
  a first flip-flop configured to generate the control pulse which transitions to an ON level when the set signal is asserted and transitions to an OFF level when the reset signal is asserted.

4. The controller of claim 3, wherein the forcible OFF circuit is configured to generate a forcible OFF signal asserted after the time-up period lapses since it is detected that the switching transistor is turned on or when the synchronous rectifying transistor is turned off, and
  the first flip-flop is configured to transition the control pulse to an OFF level when at least one of the reset signal and the forcible OFF signal is asserted.

5. The controller of claim 3, wherein the set signal generating part comprises a first comparator configured to compare a drain voltage of the synchronous rectifying transistor with a first negative threshold voltage to output the set signal based on a comparison result, and
  the reset signal generating part comprises a second comparator configured to compare the drain voltage with a second negative threshold voltage to output the reset signal based on a comparison result.

6. The controller of claim 1, wherein the forcible OFF circuit comprises:
  a capacitor;
  a current source configured to charge the capacitor;
  a fifth comparator configured to compare a voltage of the capacitor with a predetermined fifth threshold voltage; and
  a pull-up circuit configured to pull up the voltage of the capacitor to a voltage higher than the fifth threshold voltage when the synchronous rectifying transistor is turned off, and
  wherein the forcible OFF circuit shifts to the forcible OFF state depending on an output from the fifth comparator.

7. A synchronous rectifying controller disposed on a secondary side of an insulating synchronous rectifying DC/DC converter to control a synchronous rectifying transistor, comprising:
  a first comparator configured to compare a drain voltage of the synchronous rectifying transistor with a first negative threshold voltage, and when the drain voltage is lower than the first threshold voltage, assert a set signal;
  a second comparator configured to compare the drain voltage with a second negative threshold voltage, and when the drain voltage is higher than the second threshold voltage, assert a reset signal;
  a first flip-flop configured to generate a control pulse which transitions to an ON level when the set signal is asserted and transitions to an OFF level when at least one of the reset signal and a forcible OFF signal is asserted;
  a fourth comparator configured to compare the drain voltage with a fourth positive threshold voltage, and when the drain voltage is higher than the fourth threshold voltage, assert a detection signal; and
  a forcible OFF circuit configured to start to measure time when the detection signal is asserted, and to assert the forcible OFF signal after a predetermined time-up period lapses or when the control pulse transitions to the OFF level.

8. The controller of claim 7, wherein the forcible OFF circuit comprises:
  a capacitor;
  a current source configured to charge the capacitor;
  a fifth comparator configured to compare a voltage of the capacitor with a predetermined fifth threshold voltage; and
  a pull-up circuit configured to pull up the voltage of the capacitor to a voltage higher than the fifth threshold voltage when the synchronous rectifying transistor is turned off, and
  wherein the forcible OFF signal depends on an output from the fifth comparator.

9. A method of controlling a synchronous rectifying transistor of an insulating synchronous rectifying DC/DC converter, comprising:
  transitioning a control pulse to an ON level indicating ON of the synchronous rectifying transistor when it is detected that a switching transistor at a primary side of the DC/DC converter is turned off;
  transitioning the control pulse to an OFF level indicating OFF of the synchronous rectifying transistor when it is detected that a current of a secondary winding of a transformer becomes substantially zero;
  switching the synchronous rectifying transistor depending on the control pulse; and
  starting to measure time after it is detected that the switching transistor is turned on, and forcibly turning off the synchronous rectifying transistor after a predetermined time-up period lapses or when the synchronous rectifying transistor is turned off.

10. A method of controlling a synchronous rectifying transistor of an insulating synchronous rectifying DC/DC converter, comprising:
  comparing a drain voltage of the synchronous rectifying transistor with a first negative threshold voltage, and when the drain voltage is lower than the first threshold voltage, asserting a set signal;
  comparing the drain voltage with a second negative threshold voltage, and when the drain voltage is higher than the second threshold voltage, asserting a reset signal;
  generating a control pulse which transitions to an ON level when the set signal is asserted and transitions to an OFF level when at least one of the reset signal and a forcible OFF signal is asserted;
  comparing the drain voltage with a third positive threshold voltage, and when the drain voltage is higher than the third threshold voltage, asserting a detection signal; and
  starting to measure time when the detection signal is asserted, and asserting the forcible OFF signal after a predetermined time-up period lapses or when the control pulse transitions to an OFF level.

* * * * *